US010767751B2

(12) United States Patent
Hashimoto et al.

(10) Patent No.: US 10,767,751 B2
(45) Date of Patent: Sep. 8, 2020

(54) PLANETARY GEAR DEVICE AND VEHICLE WHEEL DRIVE DEVICE

(71) Applicant: MITSUBISHI ELECTRIC CORPORATION, Chiyoda-ku, Tokyo (JP)

(72) Inventors: Michinori Hashimoto, Tokyo (JP); Hideo Terasawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 169 days.

(21) Appl. No.: 16/085,144

(22) PCT Filed: Mar. 29, 2016

(86) PCT No.: PCT/JP2016/060059
§ 371 (c)(1),
(2) Date: Sep. 14, 2018

(87) PCT Pub. No.: WO2017/168551
PCT Pub. Date: Oct. 5, 2017

(65) Prior Publication Data
US 2020/0096089 A1 Mar. 26, 2020

(51) Int. Cl.
*F16H 57/08* (2006.01)
*F16H 57/04* (2010.01)
(Continued)

(52) U.S. Cl.
CPC ..... *F16H 57/0457* (2013.01); *B60B 27/0021* (2013.01); *B60B 27/0047* (2013.01);
(Continued)

(58) Field of Classification Search
None
See application file for complete search history.

(56) References Cited

U.S. PATENT DOCUMENTS 8,556,761 B1 10/2013 Carlton
2013/0049439 A1* 2/2013 Yamada ............... B60K 7/0007
301/6.5
(Continued)

FOREIGN PATENT DOCUMENTS

JP H09-068262 A 3/1997
JP 2013-249950 A 12/2013

OTHER PUBLICATIONS

International Search Report (PCT/ISA/210) dated Jun. 28, 2016, by the Japanese Patent Office as the International Searching Authority for International Application No. PCT/JP2016/060059.
(Continued)

*Primary Examiner* — Justin Holmes
(74) *Attorney, Agent, or Firm* — Buchanan Ingersoll & Rooney PC

(57) ABSTRACT

A first labyrinth seal includes: a drive shaft side annular protrusion that is formed on one of the slinger and the drive shaft seal plate and that protrudes over the circumference of the drive shaft; and a drive shaft side annular groove that is formed on the other of the slinger and the drive shaft seal plate and that recedes over the circumference of the shaft. A second labyrinth seal includes: a carrier-side annular protrusion that is formed on one of the carrier seal plate and the planetary carrier and that protrudes over the circumference of the shaft of the planetary carrier; and a carrier-side annular groove that is formed on the other of the carrier seal plate and the planetary carrier and that recedes over the circumference of the shaft.

11 Claims, 11 Drawing Sheets

(51) Int. Cl.
*B60B 27/00* (2006.01)
*F16C 33/78* (2006.01)
*F16H 1/36* (2006.01)
*B60K 7/00* (2006.01)

(52) U.S. Cl.
CPC .......... *F16C 33/7816* (2013.01); *F16H 1/36* (2013.01); *F16H 57/0471* (2013.01); *F16H 57/0479* (2013.01); *F16H 57/0486* (2013.01); *F16H 57/082* (2013.01); *B60B 2380/73* (2013.01); *B60B 2900/111* (2013.01); *B60B 2900/114* (2013.01); *B60B 2900/5118* (2013.01); *B60B 2900/561* (2013.01); *B60K 7/0007* (2013.01); *B60K 2007/0092* (2013.01)

(56) References Cited

U.S. PATENT DOCUMENTS

2013/0255416 A1* 10/2013 Terauchi .................. B60T 5/00
74/411.5
2018/0363758 A1* 12/2018 Jiang ........................ B25J 17/00

OTHER PUBLICATIONS

Written Opinion (PCT/ISA/237) dated Jun. 28, 2016, by the Japanese Patent Office as the International Searching Authority for International Application No. PCT/JP2016/060059.

* cited by examiner

SECOND DIRECTION ← → FIRST DIRECTION

SECOND DIRECTION ← | → FIRST DIRECTION

PLANETARY GEAR DEVICE AND VEHICLE WHEEL DRIVE DEVICE

TECHNICAL FIELD

The present disclosure relates to a planetary gear device and a vehicle wheel drive device using the planetary gear device.

BACKGROUND ART

A planetary gear device including a planetary gear, in which a gear center shaft engages with a cylindrical internal gear and revolves, and a sun gear at the center of the planetary gear engaging with the planetary gear, is small in size and lightweight and is a gear device that can increase a reduction gear ratio. The planetary gear devices are used for various applications such as speed reduction devices, transmissions and pumps.

In the planetary gear device, lubrication is essential for bearings supporting the planetary gears and rotating members, and teeth surfaces of engaging gears. The bearings and engaging gear surfaces of the planetary gear device are generally lubricated with lubricating oil. A gap exists between opposing surfaces of a fixed portion supporting the gear device and an input rotation portion input and/or an output rotation portion input from/output to the outside due to the relative movement of the opposing surfaces, and a lubricating oil sealed inside the gear device may leak to the outside of the gear device. Therefore, various types of seal members are used in the gap of a rotation portion to prevent oil leakage.

For example, Patent Literature 1 describes an oil lubrication structure of an automatic transmission using a planetary gear device. In the oil lubrication structure of Patent Literature 1, as described in paragraph 0037 and FIG. 1, a seal member is disposed on the rim of a clutch piston of a clutch device. Patent Literature 2 describes a bearing lubrication device for a gear box. In the bearing lubrication device of Patent Literature 2, as described in paragraph 0049 and FIG. 1F, a lip seal disposed between a retainer and a stationary pipe holds a lubrication agent such as lubricating oil for bearings and other components.

CITATION LIST

Patent Literature

Patent Literature 1: Unexamined Japanese Patent Application Kokai Publication No. H9-068262
Patent Literature 2: Unexamined Japanese Patent Application Kokai Publication No. 2013-249950

SUMMARY OF INVENTION

Technical Problem

Bearings used in vehicles have large vibrations during operation, large temperature changes while in use, and the like. Thus the bearings that are generally used in vehicles have a larger gap in the radial direction than the bearings used in industrial machinery such as machine tools, transferring machine, and the like. Therefore, rubber oil seals are often used for preventing oil leakage of a planetary gear device used for a speed reducer of a vehicle and the like. For this reason, there is a problem in that the torque transmission efficiency decreases due to the frictional force of the sliding portion.

In order to solve the above-mentioned problems, an objective of the present disclosure is to eliminate sliding between a fixed portion and a movable portion and to prevent reduction in torque transmission efficiency due to frictional force in a planetary gear device.

Solution to Problem

A planetary gear device according to the present disclosure includes an internal gear, a planetary gear engaging with the internal gear, a sun gear positioned at the center of the internal gear and engaging with the planetary gear, a planetary carrier rotatably supporting the planetary gear in a state in which the planetary gear engages with the internal gear and the sun gear, a bearing inner cylinder including the internal gear on an inner circumferential surface, a bearing coaxially fitting in the outer circumference of the bearing inner cylinder, an output shaft outer cylinder coaxially fitting in the outer circumference of the bearing, and an output shaft end plate that fixes the planetary carrier and is supported by the output shaft outer cylinder, wherein a drive shaft is disposed in one axial direction of the bearing inner cylinder and is coupled to the sun gear, and the planetary carrier is arranged in another axial direction of the planetary carrier, the planetary gear device including:

an annular slinger fitted in the drive shaft coupled to the sun gear of the planetary gear device;

an annular drive shaft seal plate fitted in an inner circumference of the bearing inner cylinder on a side of the drive shaft of the bearing inner cylinder being disposed, the drive shaft being inserted and arranged apart from the slinger so as to form a gap in the radial direction between the drive shaft and the slinger; and an annular carrier seal plate fitted in the inner circumference of the bearing inner cylinder, on the planetary carrier side of the planetary gear device, the planetary carrier being inserted at the center of the annular carrier seal plate so as to form a gap in the radial direction between the planetary carrier and the annular carrier seal plate. A drive shaft side annular protrusion protruding over the circumference of the drive shaft is formed on one of the slinger and the drive shaft seal plate, a drive shaft side annular groove recessed over the circumference of the drive shaft is formed on the other of the slinger and the drive shaft seal plate, and a first labyrinth seal includes the drive shaft side annular protrusion and the drive shaft side annular groove. A carrier side annular protrusion protruding over the circumference of the shaft of the planetary carrier is formed on one of the carrier seal plate and the planetary carrier, a carrier side annular groove recessed over the circumference of the shaft of the planetary carrier is formed on the other of the carrier seal plate and the planetary carrier, and a second labyrinth seal includes the carrier side annular protrusion and the carrier side annular groove. Furthermore, an annular protrusion protruding over the circumference of the shaft of the planetary gear device and an annular groove recessed over the circumference of the shaft are formed on each of opposing surfaces of the output shaft outer cylinder and a fixed ring, the fixed ring fixing the bearing inner cylinder on the side where the drive shaft is arranged, and a third labyrinth seal includes the annular protrusions and the annular grooves of the output shaft outer cylinder and the fixed ring.

Advantageous Effects of Invention

The planetary gear device of the present disclosure employs bearings having large gaps for railway vehicles. The planetary gear device eliminates a friction loss that is a factor reducing a torque transmission efficiency by the friction force of a sliding contact portion by only using the labyrinth seals that, due to bearing clearance, allow movement of the shaft in the radial direction. Therefore, reduction of the torque transmission efficiency can be prevented.

DESCRIPTION OF EMBODIMENTS

Figure 1:
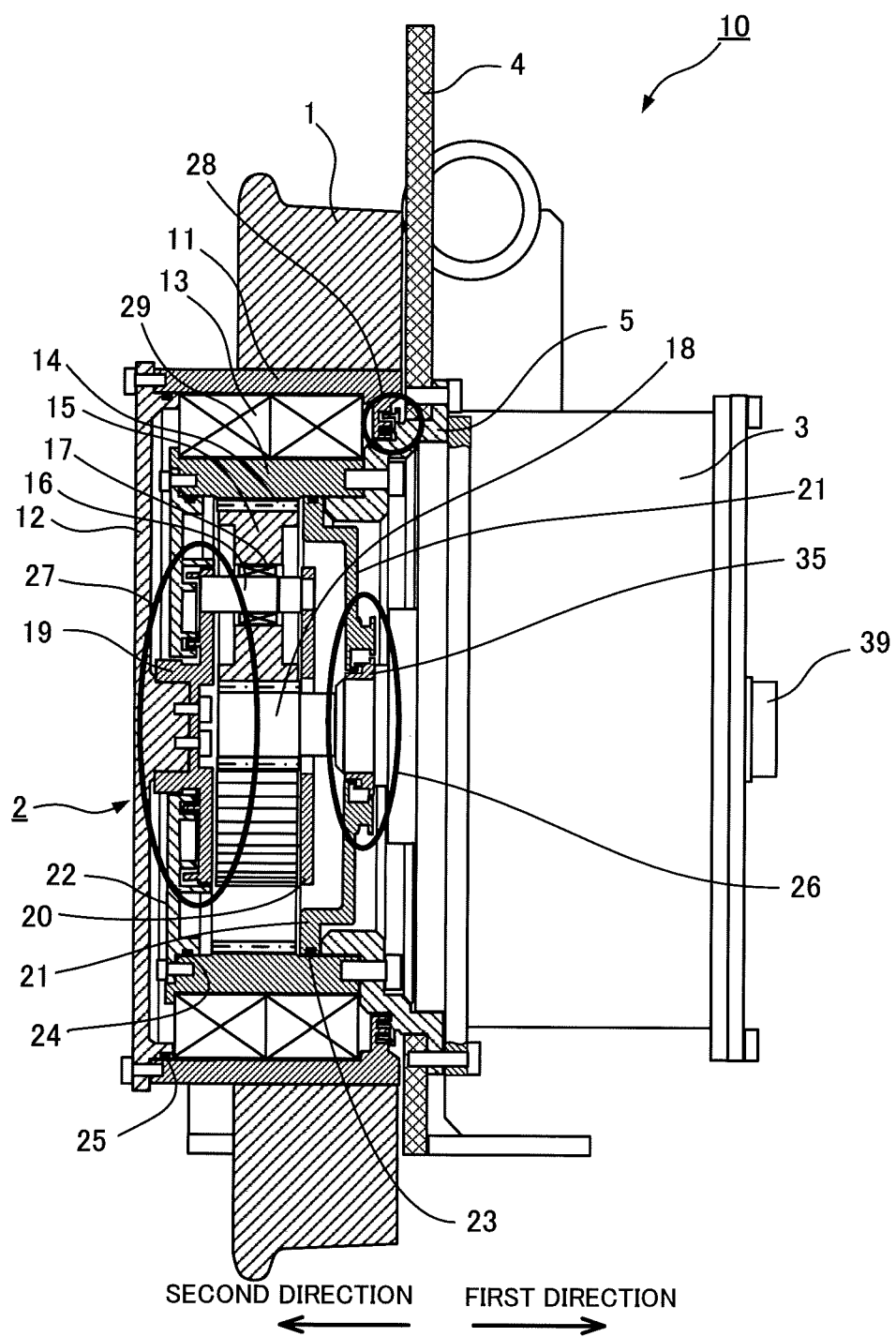
FIG. 1 is a cross-sectional view illustrating an internal configuration of a vehicle wheel drive device according to Embodiment 1 of the present disclosure.

Hereinafter, embodiments of the present disclosure are described in detail with reference to the drawings. Identical or corresponding parts are denoted by the same reference signs in the drawings. In order to avoid complication of the figures and to facilitate understanding, there are cases in which bolts, nuts, holes through which bolts are passed, and the like are omitted from the figures. Also, increasing or decreasing the outer diameter or inner diameter means monotonically increasing or monotonically decreasing in a broad sense, and a portion of the outer diameter or inner diameter may be constant.

Embodiment 1

FIG. 1 is a cross-sectional view illustrating an internal configuration of a vehicle wheel drive device according to Embodiment 1 of the present disclosure. A vehicle wheel drive device 10 according to Embodiment 1 uses a planetary gear device 2 in which a drive shaft 39 coupled to a sun gear 18 is an input shaft and an output shaft outer cylinder 11 is an output shaft. Here, viewing from an internal gear 14 of the planetary gear device 2 in the axial direction, the direction of the drive shaft 39 is referred to as a first direction, and the direction of a planetary carrier 19 opposite to the drive shaft 39 is referred to as a second direction.

In the planetary gear device 2 according to Embodiment 1, an annular slinger 35 fitted in the drive shaft 39 coupled to the sun gear 18 is arranged on the first direction side of the planetary gear device 2. An annular drive shaft seal plate 21, in which the drive shaft 39 is inserted and arranged apart from the slinger 35 to form a gap in the radial direction, the annular drive shaft seal plate 21 fitted in the inner circumference of a bearing inner cylinder 29 on the first direction side of the bearing inner cylinder 29. The slinger 35 and the drive shaft seal plate 21 are included in a first labyrinth seal 26. Further, an annular carrier seal plate 22, in which the planetary carrier 19 is inserted at the center of the carrier seal plate 22 to form a gap in the radial direction, the annular carrier seal plate 22 being fitted in the inner circumference of the bearing inner cylinder 29 on the second direction side of the planetary gear device 2. The carrier seal plate 22 and the planetary carrier 19 are included in a second labyrinth seal 27. Furthermore, in the vehicle wheel drive device 10, the output shaft outer cylinder 11 and a fixed ring 5 fixing the bearing inner cylinder 29 are included in a third labyrinth seal 28.

O-rings 23, 24, and 25 are disposed in a fastening portion without relative movement, and a labyrinth seal is formed between a fixed portion and a movable portion having relative movement. Leakage of lubricating oil to the outside is prevented, the lubricating oil being used for lubrication in the planetary gear device. Forming a labyrinth seal between the fixed portion and the movable portion, by eliminating generation of friction torque due to sliding contact, prevents reduction in the torque transmission efficiency.

The vehicle wheel drive device 10 includes the planetary gear device 2, a drive motor 3, a support frame 4, and the fixed ring 5. A vehicle wheel 1 is fitted in the outer circumference of the output shaft outer cylinder 11 in the radial direction in a rotation preventing manner. The support frame 4 supports the vehicle wheel 1 so as to be rotatable around the shaft of the planetary gear device 2.

The planetary gear device 2 includes the internal gear 14, a planetary gear 15 engaging with the internal gear 14, the sun gear 18 positioned at the center of the internal gear 14 and engaging with the planetary gear 15, the planetary carrier 19 rotatably supporting the planetary gear 15 in a state in which the planetary gear 15 is engaged with the internal gear 14 and the sun gear 18, the bearing inner cylinder 29 including the inner gear 14 on the inner circumferential surface thereof, a bearing 13 coaxially fitted in the outer circumference of the bearing inner cylinder 29, the output shaft outer cylinder 11 coaxially fitted in the outer circumference of the bearing 13, and an output shaft end plate 12 that fixes the planetary carrier 19 and is supported by the output shaft outer cylinder 11. The bearing inner cylinder 29 is fixed to the fixed ring 5 on the first direction side, and the fixed ring 5 is fitted and fixed to the support frame 4. In the planetary gear device 2, the bearing inner cylinder 29 is fixed to and supported by the support frame 4.

The planetary gear 15 is rotatably supported by a planetary gear shaft 16 via a bearing 17, and the planetary gear shaft 16 is supported by the planetary carrier 19 and a planetary shaft support disc 20. The sun gear 18 is positioned at the center of the internal gear 14 and engages with the planetary gear 15. The drive motor 3 is coaxially fixed to the planetary gear device 2 on the side of the fixed ring 5 opposite side to that of the planetary gear device 2, that is, on the first direction side. The drive shaft 39 of the drive motor 3 is coupled to the sun gear 18.

The planetary carrier 19 is disposed on the second direction side of the planetary gear device 2 and is bolted to the output shaft end plate 12 on the second direction side. The output shaft end plate 12 is bolted to the output shaft outer cylinder 11 on the second direction side.

Figure 2:
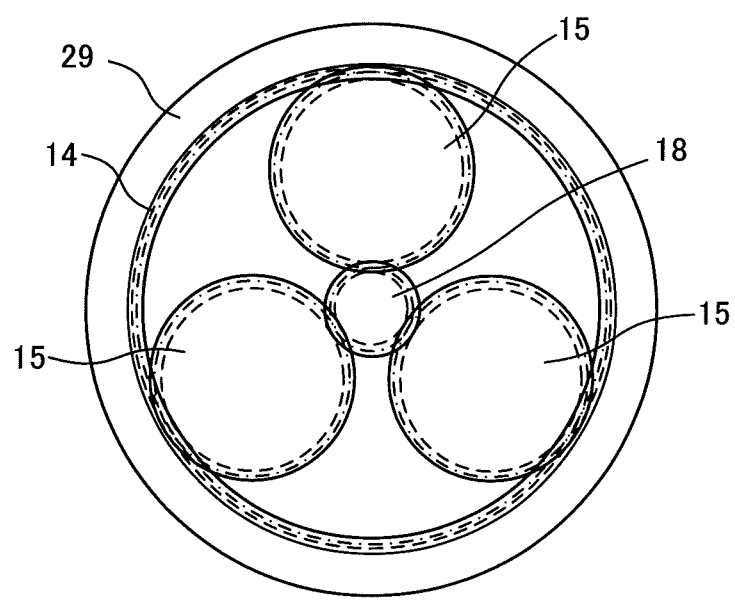
FIG. 2 is a diagram illustrating an arrangement of gears of the planetary gear device according to Embodiment 1.

FIG. 2 is a diagram illustrating an arrangement of gears of the planetary gear device according to Embodiment 1. FIG. 2 illustrates a case in which three planetary gears 15 are provided. Depending the selection of the number of teeth of each gear, two or four planetary gears 15 can be arranged. In principle, there may be one planetary gear 15 of the planetary gear device 2. Two or more planetary gears 15 are preferably arranged at equal distances around the sun gear 18 in order to cancel the force orthogonal to the shaft applied to the drive shaft 39 of the drive motor 3 and the shaft of the planetary carrier 19.

For example, when the sun gear 18 rotates clockwise in FIG. 2, since the internal gear 14 is fixed, the planetary gear 15 revolves clockwise while rotating in a counterclockwise direction. The revolution of the planetary gear 15 is conveyed from the planetary carrier 19 via the output shaft end plate 12 to the output shaft outer cylinder 11, and the output shaft outer cylinder 11 rotates. In Embodiment 1, the rotation of the drive shaft 39 and the rotation of the output shaft outer cylinder 11 are in the same direction.

As illustrated in FIG. 1, the annular slinger 35 is fitted in the drive shaft 39 on the first direction side of the planetary gear device 2. The drive shaft seal plate 21 is fitted in the inner circumference of the bearing inner cylinder 29 on the first direction side. The drive shaft seal plate 21 is annular with a hole in the center, and the drive shaft 39 is inserted through the center of the drive shaft seal plate 21. The slinger 35 and the drive shaft seal plate 21 are arranged forming a gap in the radial direction therebetween. On the second direction side of the planetary gear device 2, the carrier seal plate 22 is fitted in the inner circumference of the bearing inner cylinder 29. The carrier seal plate 22 is annular and has a hole at the center thereof, and a cylindrical portion formed at the center of the planetary carrier 19 is inserted through the carrier seal plate 22. The planetary carrier 19 and the carrier seal plate 22 are arranged forming a gap in the radial direction therebetween.

As described above, the first labyrinth seal 26 includes the drive shaft seal plate 21 and the slinger 35. A drive shaft side annular protrusion protruding over the circumference of the drive shaft 39 is formed on one of the slinger 35 and the drive shaft seal plate 21, and a drive shaft side annular groove recessed over the circumference of the drive shaft 39 is formed on the other of the slinger 35 and the drive shaft seal plate 21. The first labyrinth seal 26 includes the drive shaft side annular protrusion and the drive shaft side annular groove.

In addition, the second labyrinth seal 27 includes the carrier seal plate 22 and the planetary carrier 19. A carrier side annular protrusion that protrudes over the circumference of the shaft of the planetary carrier 19 is formed on one of the carrier seal plate 22 and the planetary carrier 19, and a carrier side annular groove recessed over the circumference of the shaft of the planetary carrier 19 is formed on the other of the carrier seal plate 22 and the planetary carrier 19. The second labyrinth seal 27 includes the carrier side annular protrusion and the carrier side annular groove.

A surface facing the fixed ring 5 in the axial direction is formed on the first direction side of the output shaft outer cylinder 11. The output shaft outer cylinder 11 is arranged apart from the fixed ring 5 forming a gap. An annular protrusion protruding in the axial direction and an annular groove recessed in the axial direction over the circumference of the shaft of the planetary gear device 2 are formed on the output shaft outer cylinder 11 and the fixed ring 5, respectively. The third labyrinth seal 28 includes the annular protrusions and the annular grooves of the output shaft outer cylinder 11 and the fixed ring 5.

The planetary gear 15 and the sun gear 18 rotating at high speeds exist in an area surrounded by the bearing inner cylinder 29, the drive shaft seal plate 21, the carrier seal plate 22, the first labyrinth seal 26 and the second labyrinth seal 27. An appropriate amount of lubricating oil is enclosed to lubricate the engaged portions of the teeth and the bearing 17 supporting the planetary gear 15. The lubricating oil or grease is enclosed in an area surrounded by the output shaft end plate 12, the output shaft outer cylinder 11, the fixed ring 5, the bearing inner cylinder 29, the second labyrinth seal 27, and the third labyrinth seal 28 for lubricating the bearing 13 rotating at a low speed.

Figure 3:
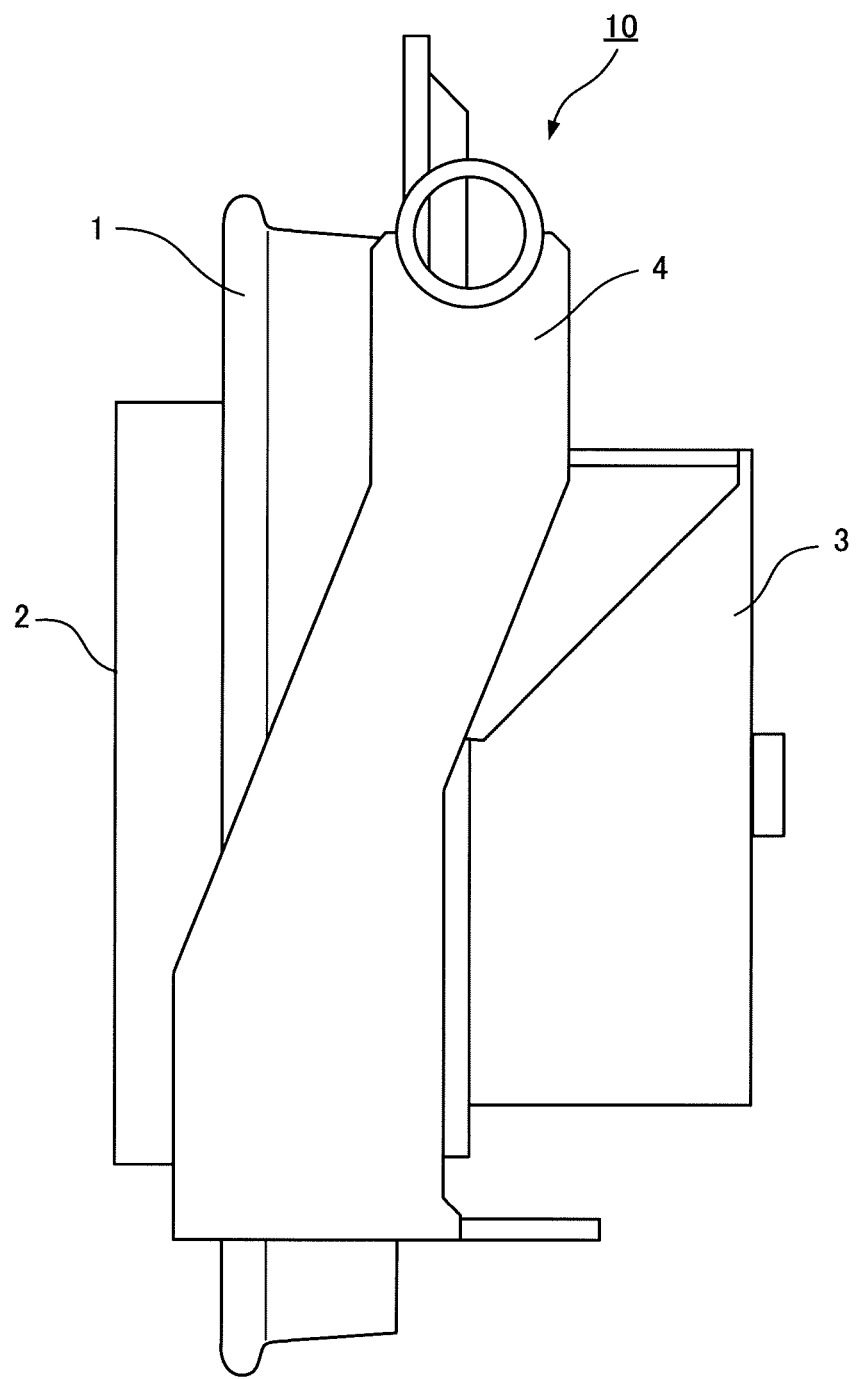
FIG. 3 is a side view of the vehicle wheel drive device according to Embodiment 1.
Figure 4:
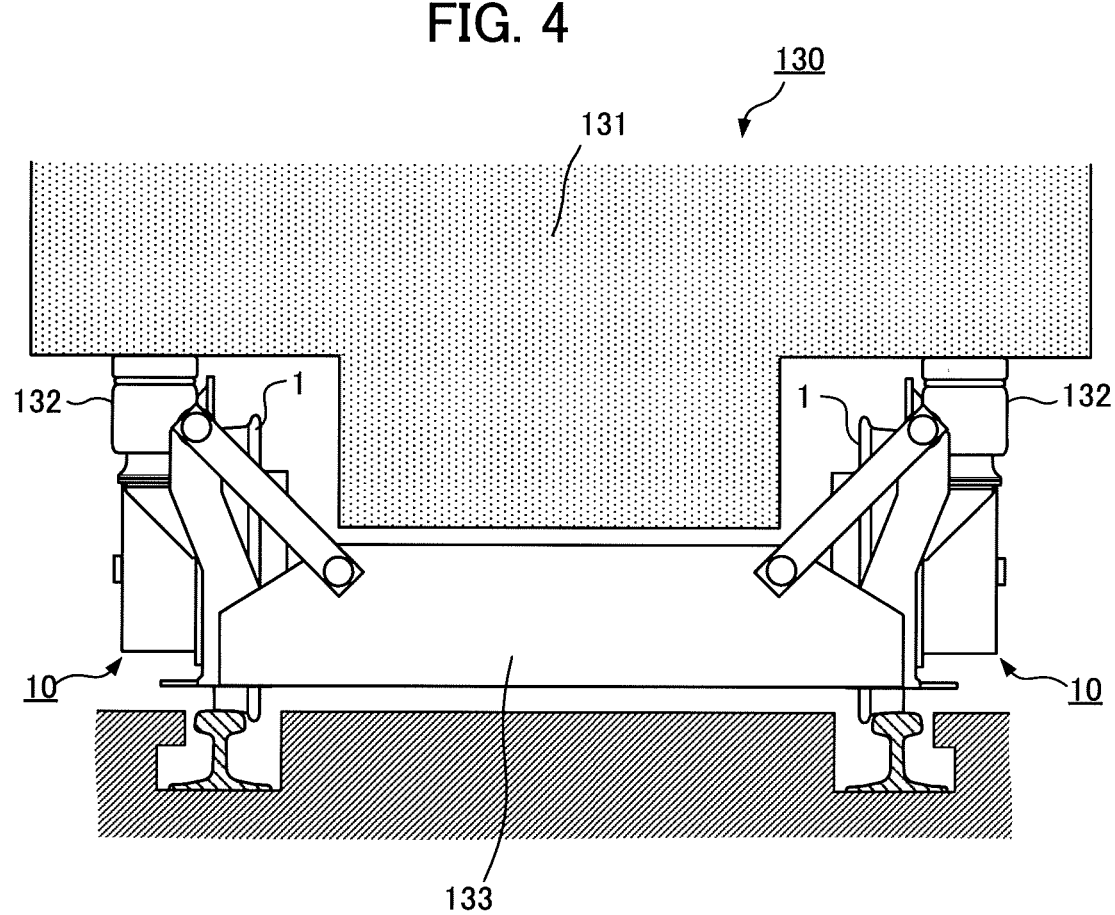
FIG. 4 is a diagram illustrating an example of a vehicle including the vehicle wheel drive device according to Embodiment 1.

FIG. 3 is a side view of the vehicle wheel drive device according to Embodiment 1. FIG. 4 is a diagram illustrating an example of a vehicle including the vehicle wheel drive device according to Embodiment 1. The vehicle 130 illustrated in FIG. 4 travels on a track of two rails. The vehicle 130 includes two vehicle wheel drive devices 10 illustrated in FIG. 1 facing each other on the left and right. A vehicle body 131 of the vehicle 130 is supported by the support frame 4 of the vehicle wheel drive device 10 via a suspension system 132. Each of the vehicle wheels 1 is supported so as to be capable of rolling on a rail. The support frames 4 of the two opposing vehicle wheel drive devices 10 are connected by, for example, two frames 133 fixed to the front and rear sides of the support frame 4. Structures for connecting the support frames 4 to each other are not limited to the frame 133 in FIG. 4. In FIG. 4, a mechanism for conveying a force in the front-rear direction (the direction orthogonal to the paper surface of FIG. 3) between the vehicle wheel drive device 10 and the vehicle body 131 is omitted. For example, the force in the front-rear direction can be conveyed between the vehicle wheel drive device 10 and the vehicle body 131 by using tow links rotatably coupled to the support frame 4 and the vehicle body 131, respectively, around the left and right direction shafts. Hereinafter, the labyrinth seals of the planetary gear device and the vehicle wheel drive device according to Embodiment 1 are described in detail.

Figure 5:
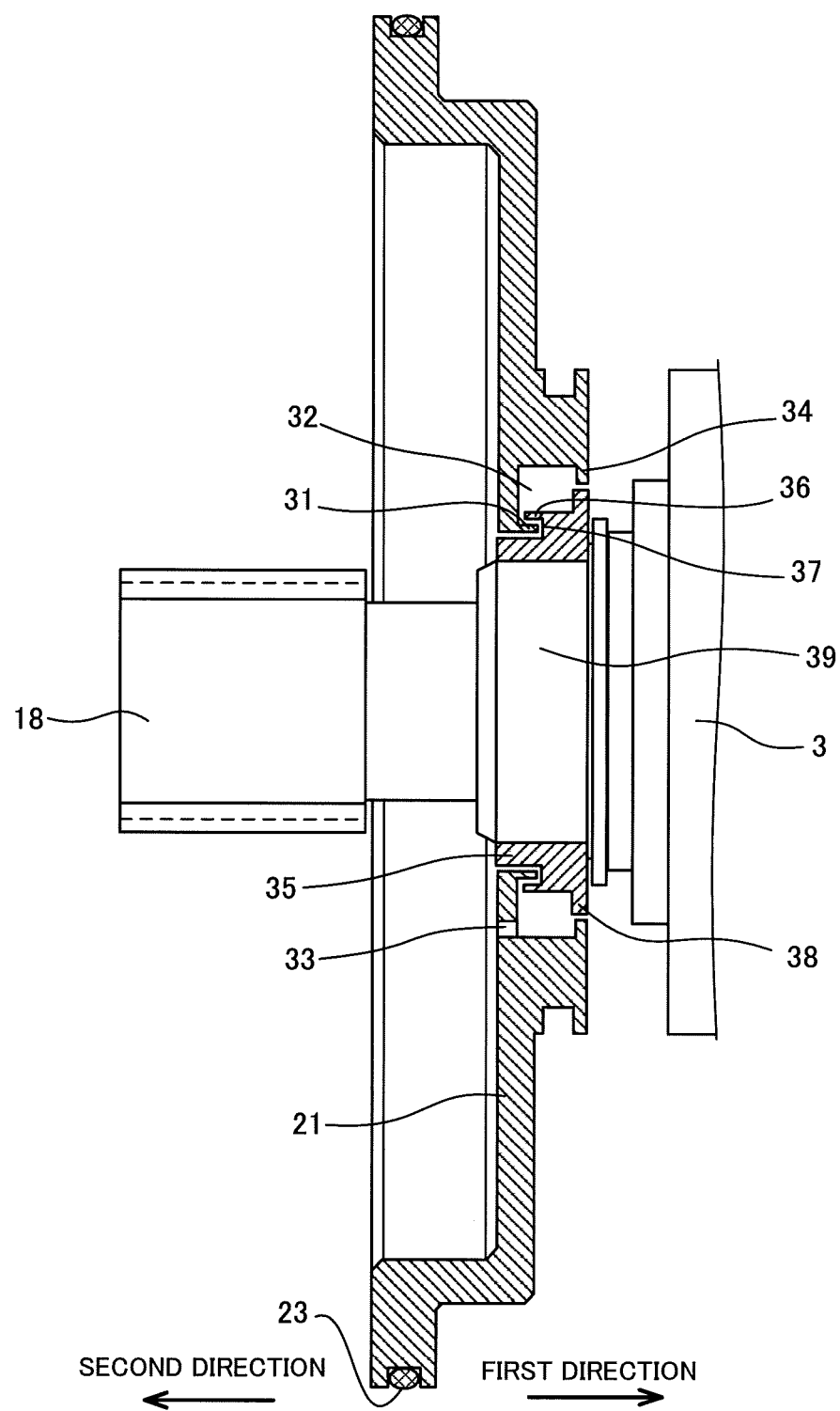
FIG. 5 is a cross-sectional view of a first labyrinth seal according to Embodiment 1.

FIG. 5 is a cross-sectional view of the first labyrinth seal according to Embodiment 1. The drive shaft seal plate 21 is fitted in the inner circumference on the first direction side of the bearing inner cylinder 29. The drive shaft seal plate 21 is an annular member in which a hole through which the drive shaft 39 is inserted is formed at the center of the drive shaft seal plate 21. An annular protrusion 31 (a first annular protrusion) protruding in the first direction over the circumference of the drive shaft 39 is formed on the inner circumference of the drive shaft seal plate 21, and an annular groove 32 (a first annular groove) recessed in the second direction over the circumference of the shaft on the outer circumferential side of the annular protrusion 31 is formed on the outer circumferential side of the annular protrusion 31. Furthermore, an inner circumferential protrusion 34 (a first inner circumferential protrusion) is formed that protrudes further to the first direction than the first annular protrusion 31 over the circumference of the shaft on the outer circumferential side of the annular groove 32, and in which the first direction side tip extends to the inner circumferential side over the circumference of the shaft. A return hole 33 (a first return hole) penetrating in the second direction is formed in the lowest portion of the annular groove 32 in the drive shaft seal plate 21. The drive shaft seal plate 21 is fitted in the bearing inner cylinder 29 so that the return hole 33 is located at the lowest portion of the annular groove 32.

The slinger 35 is an annular member to be fitted to the drive shaft 39. The slinger 35 includes a cylindrical portion facing the inner circumference of the drive shaft seal plate 21 forming a gap in the radial direction, and an annular groove 37 (a second annular groove) is formed that is recessed in the first direction over the circumference of the drive shaft 39, and the annular protrusion 31 of the drive shaft seal plate 21 is fitted in the annular groove 37 to form a gap. On the outer circumferential side of the annular groove 37, an annular protrusion 36 (a second annular protrusion) is formed that protrudes in the second direction over the circumference of the shaft, and fits in the annular groove 32 of the drive shaft seal plate 21 forming to form a gap. Further, an outer circumferential protrusion 38 (a first outer circumferential protrusion) is formed that outwardly protrudes in the radial direction over the circumference of the shaft on the outer circumference of the slinger 35.

The inner circumferential protrusion 34 of the drive shaft seal plate 21 and the outer circumferential protrusion 38 of the slinger 35 oppose each other in the radial direction forming a gap therebetween. The slinger 35 and the drive shaft seal plate 21 are arranged apart forming a gap from each other. The lubricating oil seeping between the annular protrusion 31 and the annular protrusion 36 from the side of the sun gear 18 enters the annular groove 32 and is then returns from the return hole 33 to the inside of the planetary gear device 2 in which the lubricating oil is sealed.

Each of the annular protrusion 31 and the annular protrusion 36 is a drive shaft side annular protrusion, and each of the annular groove 32 and the annular groove 37 is a drive shaft side annular groove. In Embodiment 1, the first labyrinth seal 26 includes the annular protrusion 31, the annular groove 32, and the inner circumferential protrusion 34 of the drive shaft seal plate 21, and the cylindrical portion, the annular groove 37, the annular protrusion 36, and an outer circumferential protrusion 38 of the slinger 35.

Figure 6:
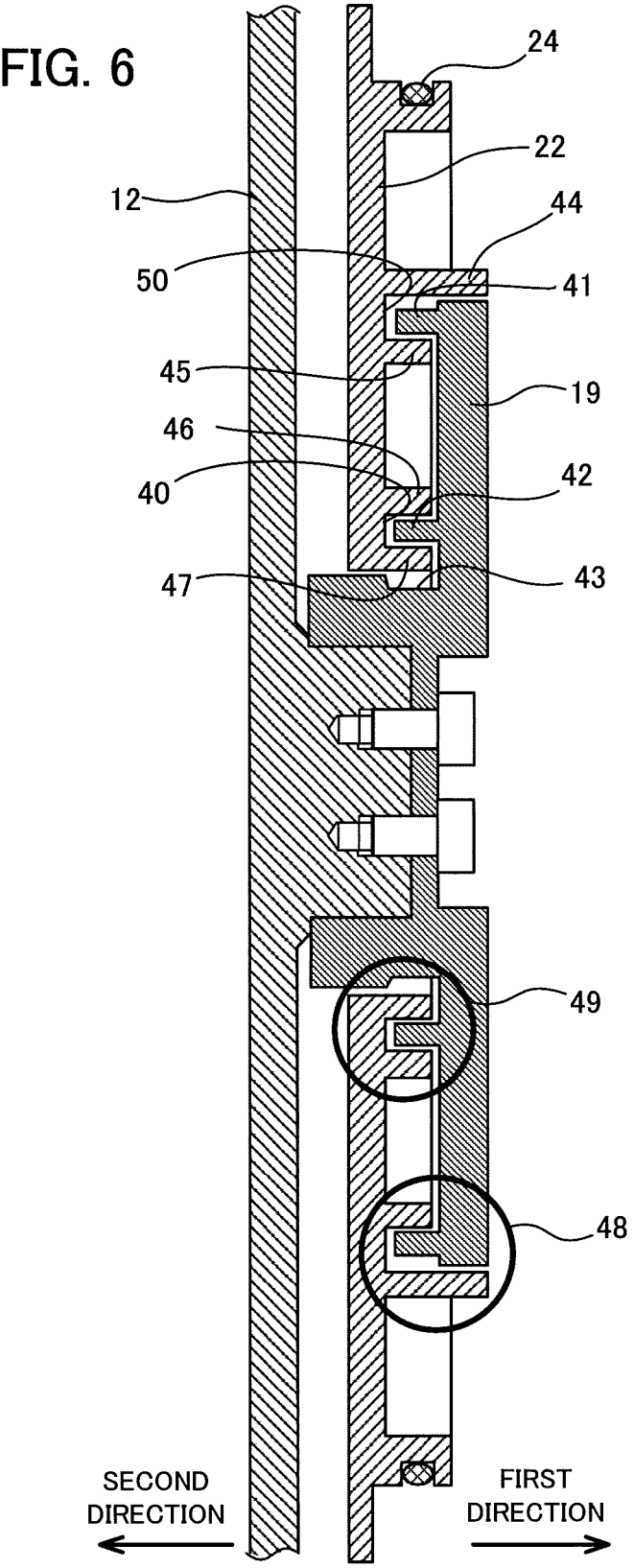
FIG. 6 is a cross-sectional view of a second labyrinth seal according to Embodiment 1.

FIG. 6 is a cross-sectional view of a second labyrinth seal according to Embodiment 1. The planetary carrier 19 includes a cylindrical boss portion at the center thereof protruding in the second direction. The boss portion penetrates through the carrier seal plate 22. An outer circumferential groove 43 (a second outer circumferential groove), an annular protrusion 42 (a third annular protrusion), and an annular protrusion 41 (a fourth annular protrusion) are formed in the planetary carrier 19. The outer circumferential groove 43 is recessed inward in the radial direction over the entire circumference of the boss portion on the outer circumferential surface of the boss portion in the radial direction. The annular protrusion 42 protrudes in the second direction over the circumference of the shaft and is arranged apart from the outer circumferential surface of the boss portion. The annular protrusion 41 protrudes in the second direction over the circumference of the shaft on the outer circumferential side of the annular protrusion 42.

The carrier seal plate 22 is fitted in the inner circumference on the second direction side of the bearing inner cylinder 29. The carrier seal plate 22 is an annular member in which a hole is formed in the center. An annular protrusion 47 (a fifth annular protrusion) and an annular protrusion 46 (a sixth annular protrusion) are formed on the carrier seal plate 22. The annular protrusion 47 is arranged apart further to the inner circumferential side than the annular protrusion 42 of the planetary carrier 19 and protrudes in the first direction over the circumference of the shaft. The annular protrusion 46 protrudes in the first direction over the circumference of the shaft such that an annular groove 40 (a third annular groove) is formed between the annular protrusion 47 and the annular protrusion 46 further to the outer circumferential side than the annular protrusion 42 further to the inner circumferential side than the annular protrusion 41 to sandwich the annular protrusion 42 forming a gap. An annular protrusion 45 (a seventh annular protrusion) and an annular protrusion 44 (an eighth annular protrusion) are formed on the carrier seal plate 22. The annular protrusion 45 is arranged further to the outer circumferential side than the annular protrusion 46 and apart further to the inner circumferential side than the annular protrusion 41 of the planetary carrier 19 and protrudes in the first direction over the circumference of the shaft. The annular protrusion 44 protrudes in the first direction over the circumference of the shaft such that an annular groove 50 (a fourth annular groove) is formed between the annular protrusion 45 and the annular protrusion 44 arranged further to the outer circumferential side than the annular protrusion 41 of the planetary carrier 19 to sandwich the annular protrusion 41 forming a gap.

The inner circumferences of the boss portion of the planetary carrier 19 and the carrier seal plate 22 are opposed in the radial direction. The planetary carrier 19 and the carrier seal plate 22 are disposed forming a gap therebetween. The lubricating oil seeping between the annular protrusions 41, 44, and 45 passes between the annular protrusions 46, 42, and 47 and flows into the outer circumferential groove 43, and is returned from the lower side of the second labyrinth seal 27 to the inside of the planetary gear device 2 in which the lubricating oil is sealed.

Each of the annular protrusion 42 and the annular protrusion 41 of the planetary carrier 19 is a carrier side annular protrusion, and each of the annular groove 40 and the annular groove 50 of the carrier seal plate 22 is a carrier side annular groove. In Embodiment 1, the second labyrinth seal 27 includes the outer circumferential groove 43, the annular protrusion 42, and the annular protrusion 41 of the planetary carrier 19, and the annular protrusion 47, the annular groove 40, the annular protrusion 46, the annular protrusion 45, the annular groove 50, and the annular protrusion 44 of the carrier seal plate 22.

In the second labyrinth seal 27 of Embodiment 1, the annular protrusions 41, 44, and 45 form a first stage labyrinth seal 48 on the outer circumferential side close to the inside of the planetary gear device 2, and the annular protrusions 42, 46, and 47 and the outer circumferential groove 43 form a second stage labyrinth seal 49 on the inner circumferential side.

Figure 7:
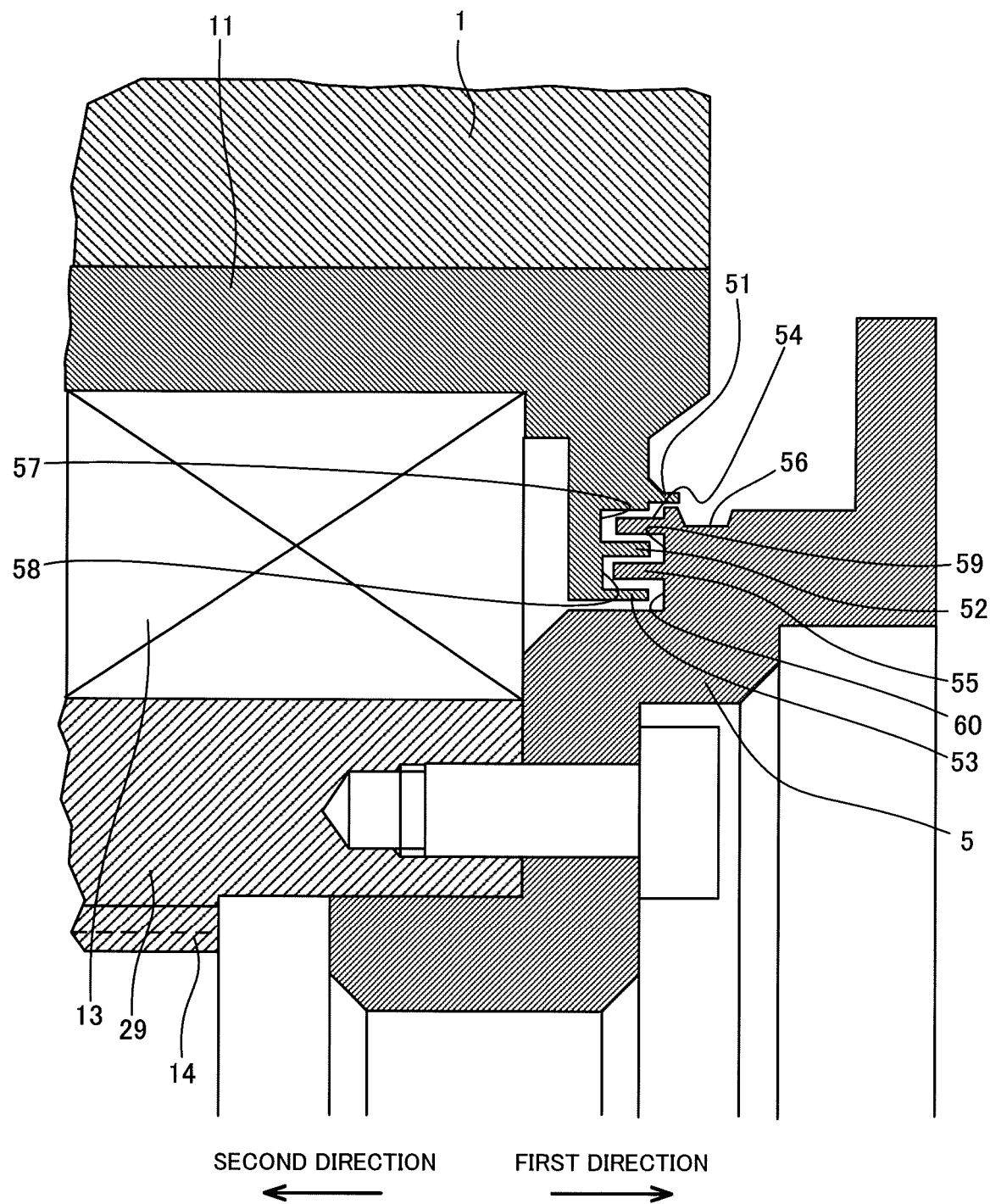
FIG. 7 is a cross-sectional view of a third labyrinth seal according to Embodiment 1.

FIG. 7 is a cross-sectional view of the third labyrinth seal according to Embodiment 1. Annular protrusions 51, 52, and 53 (outer cylinder annular protrusions) protruding in the first direction over the circumference of the shaft of the planetary gear device 2 are formed on a surface facing the fixed ring 5 in the axial direction on the first direction side on the output shaft outer cylinder 11. The annular protrusion 51 and the annular protrusion 52 form an annular groove 57 (an outer cylinder annular groove) that is recessed in the second direction over the circumference of the shaft between the annular protrusion 51 and the annular protrusion 52, and the annular protrusion 52 and the annular protrusion 53 form an annular groove 58 that is recessed in the second direction over the circumference of the shaft between the annular protrusion 52 and the annular protrusion 53.

Annular protrusions 54 and 55, that protrude in the second direction over the circumference of the shaft of the planetary gear device 2 and that are fitted in the annular grooves 57 and 58 forming a gap, are formed on a surface facing in the axial direction the output shaft outer cylinder 11 of the fixed ring 5. The annular protrusion 54 and the annular protrusion 55 form an annular groove 59 that is a fixed ring annular groove recessed in the first direction over the circumference of the shaft between the annular protrusion 54 and the annular protrusion 55. The annular protrusion 54 and the annular protrusion 55 form an annular groove 60 that is a fixed ring annular groove recessed in the first direction over the circumference of the shaft on the inner circumferential side of the annular protrusion 55. Further, an outer circumferential groove 56, which is a fixed ring outer circumferential groove recessed inward in the radial direction over the entire circumference of the shaft further to the first direction side than the annular protrusion 54, is formed in the radially outer circumferential surface of the annular protrusion 54 on the radially outer circumferential side.

The annular protrusion 54 of the fixed ring 5 is fitted into the annular groove 57 of the output shaft outer cylinder 11 forming a gap, and the annular protrusion 55 is fitted into the annular groove 58 to form a gap. The annular protrusion 52 of the output shaft outer cylinder 11 fits into the annular groove 59 of the fixed ring 5 forming a gap, and the annular protrusion 53 fits into the annular groove 60 to form a gap. The annular protrusions 51, 52, 53, 54, and 55 and the annular grooves 57, 58, 59, and 60 are inter-convoluted to form the third labyrinth seal 28 to prevent the lubricating oil from leaking from the bearing 13 side.

In Embodiment 1, the third labyrinth seal 28 is formed of the annular protrusions 51, 52, and 53 and the annular grooves 57 and 58 of the output shaft outer cylinder 11, the annular protrusions 54 and 55, the annular grooves 59 and 60 and the outer circumferential groove 56 of the fixed ring 5. In addition, the third labyrinth seal 28 faces the outside of the vehicle wheel drive device 10 and rainwater may pour between the vehicle wheel 1 and the support frame 4. In the third labyrinth seal 28, the outer annular groove 56 is arranged in the fixed ring 5 on the first direction side of the annular protrusion 51 of the output shaft outer cylinder 11, and the outer annular groove 56 prevents water, mud, sand and other foreign matters from entering into the third labyrinth seal 28.

As described above, according to Embodiment 1, the drive shaft seal plate 21 is provided on the first direction side of the bearing inner cylinder 29 and is included in the first labyrinth seal 26, and the carrier seal plate 22 is provided on the second direction side and is included in the second labyrinth seal 27. The lubricating oil contributing to lubrication inside the planetary gear device 2 is prevented from leaking to the outside by the configuration of the first labyrinth seal 26 and the second labyrinth seal 27. Since the fixed portions and the rotating portions of the first labyrinth seal 26 and the second labyrinth seal 27 are not in contact with each other, friction loss due to sliding contact can be eliminated.

In addition, since the gap between the fixed portion and the movable portion is set wider than the bearing gap, the vehicle wheel drive device 10 can be used without degradation over time and the present disclosure has an effect of enabling reduction of periodic adjustment or replacement maintenance work.

In addition, in the vehicle wheel drive device 10 using the planetary gear device 2, the third labyrinth seal 28 includes the output shaft outer cylinder 11 and the fixed ring 5 to prevent the lubricating oil from leaking to the outside from the bearing 13 side. Since the fixed portion and the rotating portion are not in contact with each other in the third labyrinth seal 28, friction loss due to sliding contact can be eliminated. Furthermore, entry of water, mud, sand and other foreign matters from the outside can also be prevented.

Since the protruding direction of the annular protrusions 31 and 36 of the drive shaft seal plate 21 and the slinger 35 is set in the direction illustrated in FIG. 5, the drive motor 3 can be dismounted from the support frame 4 while the sun gear 18 and the slinger 35 are coupled to the drive shaft 39 in a state in which the planetary gear device 2 is fixed to the support frame 4.

Embodiment 2

Figure 8:
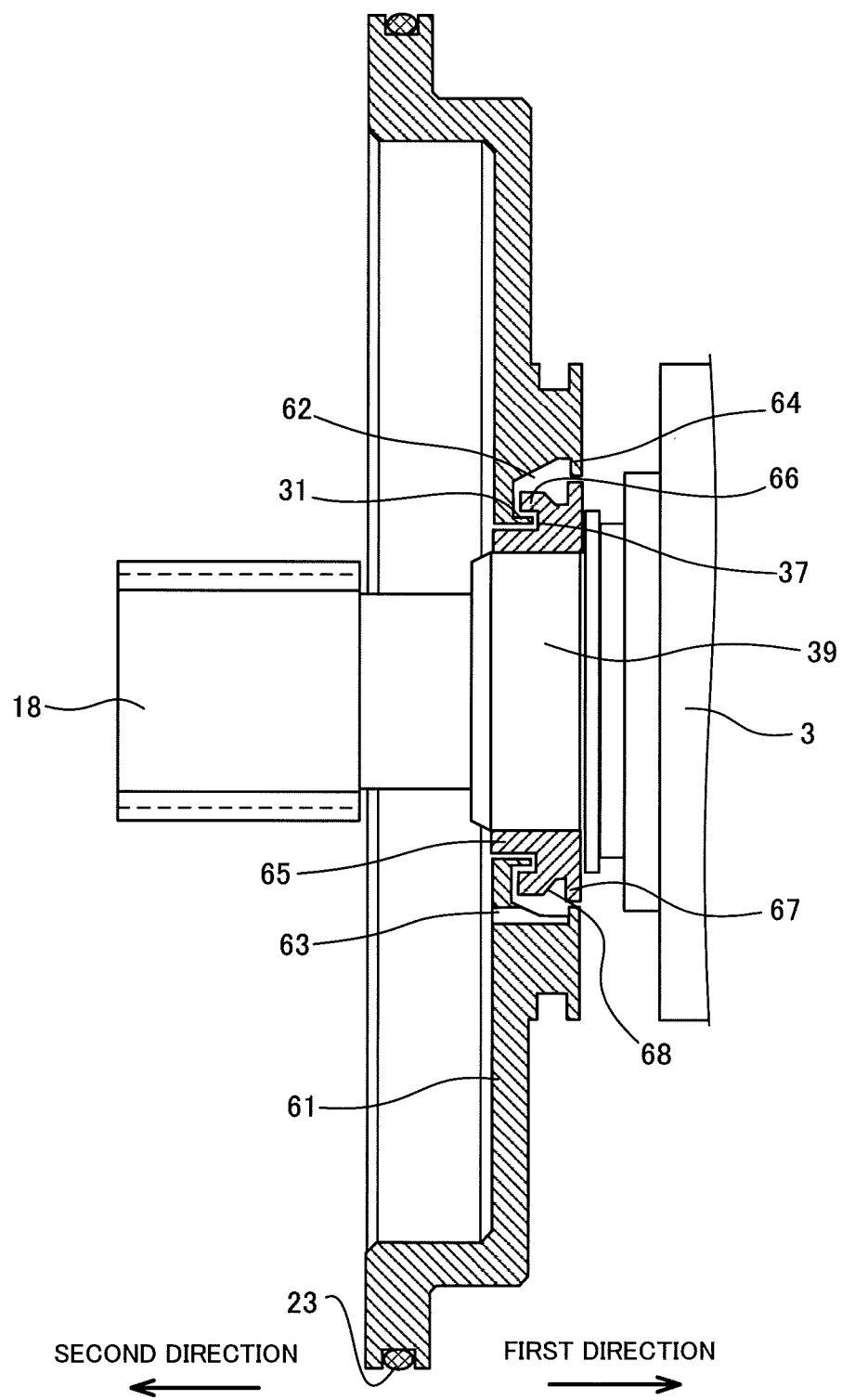
FIG. 8 is a cross-sectional view of a first labyrinth seal of a planetary gear device according to Embodiment 2 of the present disclosure.

FIG. 8 is a cross-sectional view of a first labyrinth seal of a planetary gear device according to Embodiment 2 of the present disclosure. In Embodiment 2, a shape of a portion, in which a drive shaft seal plate 61 and a slinger 65 of the first labyrinth seal 26 oppose each other, is changed. The other configurations are the same as those of the planetary gear device 2 according to Embodiment 1.

The annular protrusion 31 of the annular drive shaft seal plate 61 is inter-convoluted with the annular groove 37 of the slinger 65 without any contact in a manner similar to that of Embodiment 1. In addition, an inner circumferential protrusion 64 (a first inner circumferential protrusion) of the drive shaft seal plate 61 faces an outer circumferential protrusion 67 (a first outer circumferential protrusion) of the slinger 65 in the radial direction to form a gap.

In Embodiment 2, an outer circumferential groove 68 that is a first outer circumferential groove recessed inward in the radial direction is formed on the first direction side of an annular protrusion 66 which is the second annular protrusion of the slinger 65. The outer circumferential groove 68 includes a rotation surface whose outer diameter centered on the drive shaft 39 is reduced in the first direction from the side close to the distal end of the annular protrusion 66. The inner circumferential surface of the annular groove 62 that is the first annular groove of the drive shaft seal plate 61 has a rotation surface whose inner diameter increases in the first direction.

A portion of the lubricating oil seeped between the annular protrusions 31 and 66 adheres to the outer circumferential surface of the slinger 65 and flows into the outer circumferential groove 68, and the rest moves to the inner circumferential surface of the annular groove 62. Rotation of the drive shaft 39 rotates the slinger 65, and the lubricating oil flowing into the outer circumferential groove 68 is splashed along an inclined surface in a direction away from a gap portion in which the inner circumferential protrusion 64 and the outer circumferential protrusion 67 face each other. The lubricating oil moved to the annular groove 62 and the lubricating oil splashed from the outer circumferential groove 68 moves along the slope of the annular groove 62 to a return hole 63 that is the first return hole, and is returned to the inside of the planetary gear device 2 in which the lubricating oil is sealed.

In Embodiment 2, the inner circumferential surface of the annular groove 62 is a rotation surface whose inner diameter increases towards the inner circumferential protrusion 64, and the outer circumferential groove 68, including a rotation surface whose outer diameter decreases towards the outer circumferential protrusion 67, is arranged on the first direction side of the annular protrusion 66 of the slinger 65. Therefore, the lubricating oil seeping between the annular protrusions 31 and 66 moves along the inclined surface, and leakage from the gap portion, in which the inner circumferential protrusion 64 and the outer circumferential protrusion 67 face each other, is prevented. Since the drive shaft seal plate 61 serving as a fixed portion and the slinger 65 serving as a rotating portion are not in contact with each other, the effect of being capable of eliminating the friction loss due to sliding contact can be expected.

Embodiment 3

Figure 9:
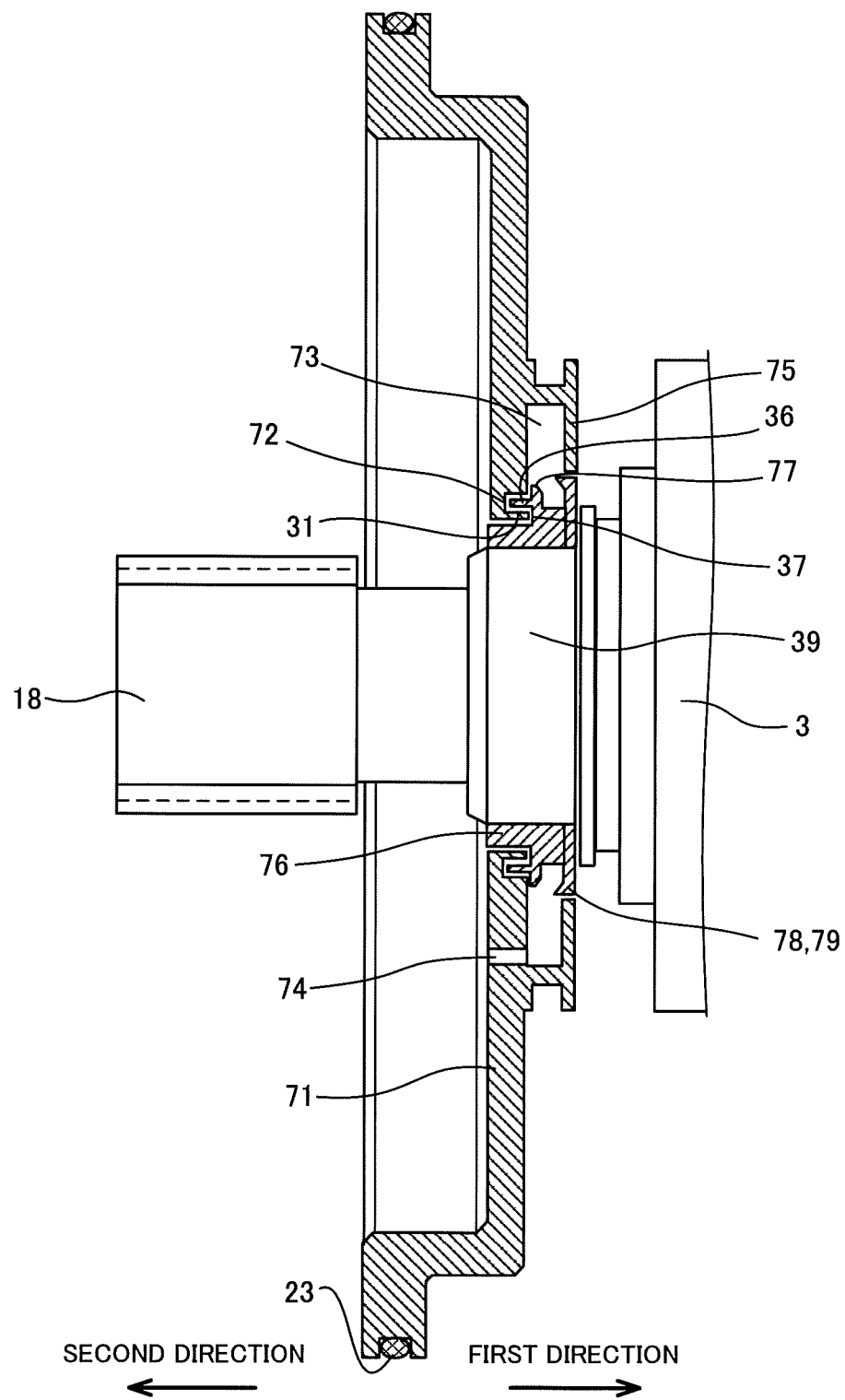
FIG. 9 is a cross-sectional view of a first labyrinth seal of a planetary gear device according to Embodiment 3 of the present disclosure.

FIG. 9 is a cross-sectional view of a first labyrinth seal of a planetary gear device according to Embodiment 3 of the present disclosure. In Embodiment 3, the shapes of the portions where a drive shaft seal plate 71 faces an slinger 76 are changed in the first labyrinth seal 26, and a rear seal disc 78 is provided on the first direction side of the slinger 76. The other configurations are the same as those of the planetary gear device 2 according to Embodiment 1.

Similar to Embodiment 1, the annular protrusion 31 of the annular drive shaft seal plate 71 is fitted into the annular groove 37 of the slinger 76 forming a gap. An annular groove 72 (a first annular groove) recessed in the second direction over the circumference of the shaft is formed on the outer circumferential side of the annular protrusion 31 in the drive shaft seal plate 71, and the annular protrusion 36 of the slinger 76 is fitted in the annular groove 72 forming a gap. An inner circumferential protrusion 75 (a first inner circumferential protrusion) protruding further to the first direction than the annular protrusion 31 over the circumference of the shaft and the first direction side tip inwardly extending over the circumference of the shaft, is formed on the outer circumferential side of the annular groove 72.

In Embodiment 3, an outer circumferential protrusion 77 (second outer circumferential protrusion) protruding outward in the radial direction over the circumference of the shaft is formed on the outer circumferential side of the annular protrusion 36 of the slinger 76. A rotation surface whose outer diameter decreases in the first direction is formed on the first direction side of the outer circumferential protrusion 77. An outer circumferential protrusion 79 (a first outer circumferential protrusion) protruding outward in the radial direction over the circumference of the shaft on the outer circumference of the slinger 76 facing the inner circumferential protrusion 75 of the drive shaft seal plate 71 in the radial direction forming a gap is formed on the first direction side of the annular protrusion 36. The outer circumferential side tip of the outer circumferential protrusion 79 includes on the second direction side a rotation surface whose inner diameter increases in the second direction.

Since the outer circumferential tip of the outer circumferential protrusion 79 is expanded in the second direction, rather than forming the slinger 76 integrally, the slinger 76 is more readily fabricated by division. Thus, in FIG. 9, a portion of the outer circumferential protrusion 79 is divided as the rear seal disc 78. The slinger 76 includes the rear seal disc 78 that is the outer circumferential protrusion 79.

In the drive shaft seal plate 71, a return hole 74 (a first return hole) penetrating in the second direction is formed at the lowermost portion of an inner circumferential groove 73 that is a first inner circumferential groove. The inner diameter of the inner circumferential groove 73 continuing to the annular groove 72 radially increases to a greater degree than Embodiment 1, and the lubricating oil seeping into the annular groove 72 becomes more distant from a gap in which the inner circumferential protrusion 75 faces the rear seal disc 78 (the outer circumferential protrusion 79). The lubricating oil splashed into the inner circumferential groove 73 is returned from the return hole 74 to the inside of the planetary gear device 2 in which the lubricating oil is sealed.

In Embodiment 3, the lubricating oil seeping between the annular protrusion 31 and the annular protrusion 36 splashes along the wall surface of the inner circumferential groove 73 away from the inner circumferential protrusion 75 due to the outer circumferential protrusion 77. A surface of the outer circumferential protrusion 77 on the side opposite to the annular protrusion 36 is a rotation surface whose outer diameter increases in the second direction. Thus, the lubricating oil adhered to the outer circumferential surface of the slinger 76 also splashes towards the wall surface of the inner circumferential groove 73 away from the inner circumferential protrusion 75. Further, the tip of the outer circumferential protrusion 79 (the rear seal disc 78) is also a rotation surface whose inner diameter increases in the second direction, and the lubricating oil adhered to the outer circumferential protrusion 79 (the rear seal disc 78) splashes in a direction away from the inner circumferential protrusion 75. Such configuration prevents leakage of the lubricating oil by seeping between the annular protrusions 31 and 36 from the gap portion in which the inner circumferential protrusion 75 and the rear seal disc 78 are opposed. Since the drive shaft seal plate 71 that is a fixed portion and the rear seal disc 78 (the outer circumferential protrusion 79) that is a rotating portion are not in contact with each other, the effect of elimination of friction loss due to sliding contact can be expected.

Embodiment 4

Figure 10:
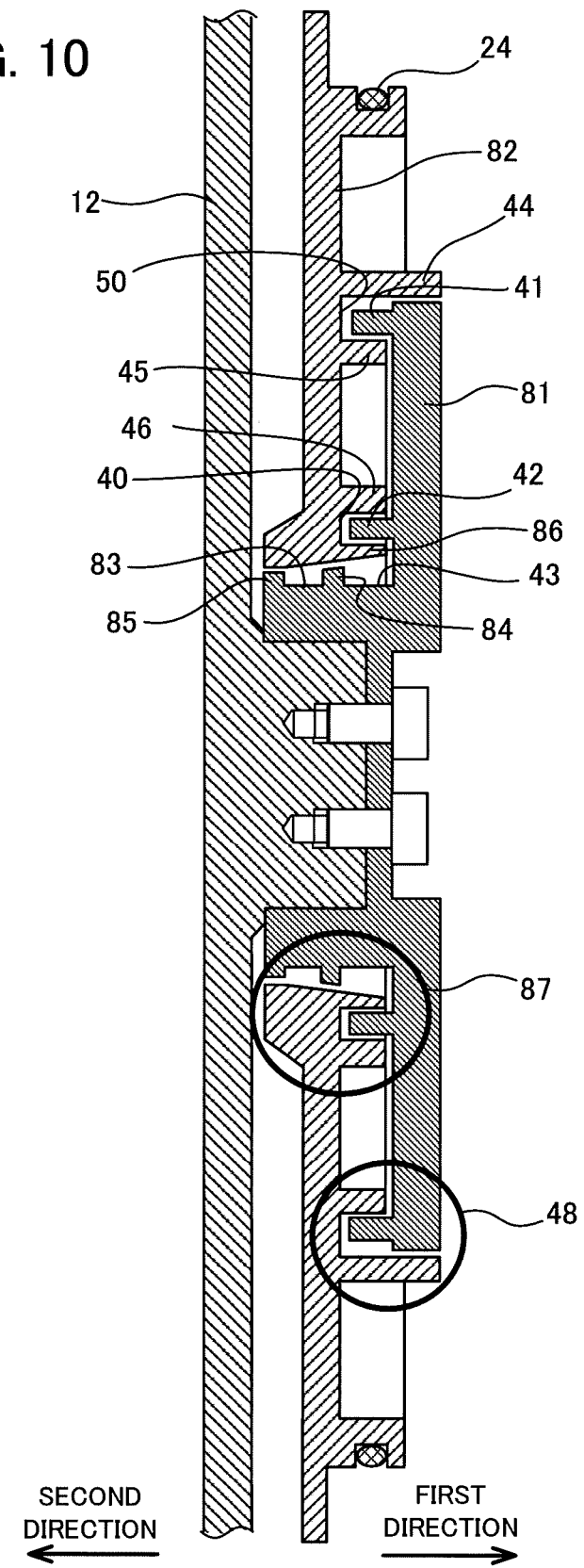
FIG. 10 is a cross-sectional view of a second labyrinth seal of a planetary gear device according to Embodiment 4 of the present disclosure.

FIG. 10 is a cross-sectional view of a second labyrinth seal of a planetary gear device according to Embodiment 4 of the present disclosure. In the planetary gear device 2 according to Embodiment 4, the shape of the portion in which the boss portion of a planetary carrier 81 opposes a carrier seal plate 82 of the second labyrinth seal 27 is changed. The other configurations are the same as those of the second labyrinth seal 27 in the planetary gear device 2 according to Embodiment 1.

The annular protrusions 41 and 42 are formed on the planetary carrier 81 in a way similar to the planetary carrier 19 of Embodiment 1. The outer circumferential groove 43 is formed in the boss portion of the planetary carrier 81. The annular protrusions 44, 45, and 46 are formed on the annular carrier seal plate 82 in a manner similar to that of the carrier seal plate 22 of Embodiment 1.

An inner circumferential surface including an annular protrusion 86 protruding in the first direction over the circumference of the carrier seal plate 82 is a rotation surface whose inner diameter increases in the first direction. The boss portion of the planetary carrier 81 forms, on the second direction side of the outer circumferential groove 43, an outer circumferential groove 83 that is a third circumferential groove recessed inward in the radial direction over the entire circumference of the boss portion in a radially outer circumferential surface, and an outer circumferential protrusion 84 that is a third outer circumferential protrusion is formed between the second outer circumferential groove and the third outer circumferential groove. An outer circumferential protrusion 85 which is a fourth outer circumferential protrusion is formed on the second direction side of the outer circumferential groove 83. The outer circumferential surface of the outer circumferential protrusion 84 includes a rotation surface which is arranged apart from the inner circumferential surface of the carrier seal plate 82 and whose outer diameter increases in the first direction. The inner circumferential surface of the carrier seal plate 82 faces a portion of the outer circumferential groove 43, the outer circumferential protrusion 84, the outer circumferential groove 83 and the outer circumferential protrusion 85 to form gaps.

In Embodiment 4, the outer circumferential grooves 43 and 83 are provided in the boss portion of the planetary carrier 81, and the tip of the outer circumferential protrusion 84 is a rotation surface whose outer diameter increases in the first direction along the inner circumferential surface of the carrier seal plate 82. Therefore, the lubricating oil attempting to move from the outer circumferential groove 43 to the outer circumferential groove 83 is returned to the outer circumferential groove 43 side due to the rotation of the planetary carrier 81, and the lubricating oil moving to the outer circumferential groove 83, after splashing on the inner circumferential surface of the carrier seal plate 82 due to the rotation of the planetary carrier 81, is also returned to the outer circumferential groove 43 and the annular protrusion 42 of the planetary carrier 81 along the rotation surface on the inner circumferential surface. In the second labyrinth seal 27 of Embodiment 4, the annular protrusion 42, the outer circumferential grooves 43 and 83, the outer circumferential protrusions 84 and 85 of the planetary carrier 81 and the inner circumferential surface, the annular protrusion 86, the annular groove 40 and the annular protrusion 46 of the carrier seal plate 82 are included in a second stage labyrinth seal 87.

The second labyrinth seal 27 of Embodiment 4, due to the first stage labyrinth seal 48 and the second stage labyrinth seal 87, prevents the lubricating oil seeping between the annular protrusions 41, 44, and 45 from leaking from a gap portion in which the inner circumferential surface of the carrier seal plate 82 faces the outer circumferential protrusion 85 of the planetary carrier 81. Since the second labyrinth seal 27 of Embodiment 4 has a structure in which the fixed portion and the movable portion are not in contact with each other, the effect of elimination of the friction loss due to sliding contact can be expected.

Embodiment 5

Figure 11:
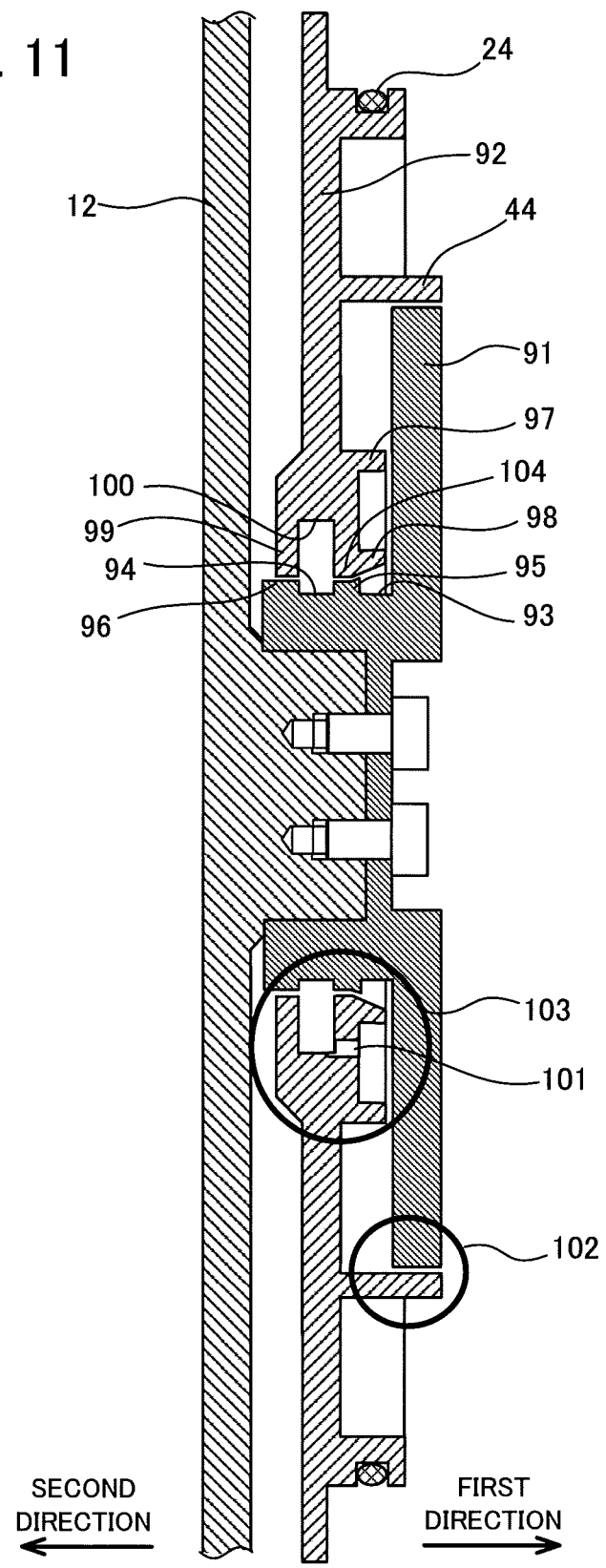
FIG. 11 is a cross-sectional view of a second labyrinth seal of a planetary gear device according to Embodiment 5 of the present disclosure.

FIG. 11 is a cross-sectional view of a second labyrinth seal of a planetary gear device according to Embodiment 5 of the present disclosure. In the planetary gear device 2 according to Embodiment 5, the second labyrinth seal 27 including a carrier seal plate 92 and a planetary carrier 91 includes a first stage labyrinth seal 102 and a second stage labyrinth seal 103. The configuration of the second labyrinth seal 27, in which the planetary carrier 91 includes, at the center thereof, a cylindrical boss portion protruding in the second direction, and the inner circumference of the boss portion and the inner circumference of the carrier seal plate 92 are opposed in the radial direction forming a gap, is similar to those of Embodiment 1 and Embodiment 4.

In the boss portion of the planetary carrier 91, an outer circumferential groove 93 is formed that is a second circumferential groove recessed inward in the radial direction over the entire circumference of the boss portion on the radially outer circumferential surface. In the boss portion, on the second direction side of the outer circumferential groove 93, an outer circumferential groove 94, which is a third outer circumferential groove recessed inward in the radial direction over the entire circumference of the boss portion on the radially outer circumferential surface, is formed, and an outer circumferential protrusion 95, which is a third outer circumferential protrusion, is formed between the outer circumferential groove 93 and the outer circumferential groove 94 on the radially outer circumferential surface. Further, an outer circumferential protrusion 96 that is a fourth outer circumferential protrusion is formed on the second direction side of the boss portion.

In the annular carrier seal plate 92, an inner circumferential protrusion 104 is formed that is a second inner circumferential protrusion that is arranged apart from and faces the outer circumferential protrusion 95 of the planetary carrier 91 in the radial direction, and protrudes inward in the radial direction. In the inner circumferential protrusion 104, an annular protrusion 98 is formed that is a fifth annular protrusion that protrudes in the first direction over the circumference of the shaft, and the annular protrusion 98 includes an inner circumferential surface having a rotation surface whose inner diameter increases in the first direction. On the outer circumferential protrusion 95 of the planetary carrier, a rotation surface is formed whose outer diameter increases in the first direction along the rotation surface of the annular protrusion 98 of the carrier seal plate 92 on a portion of the radially outer circumferential surface.

In the carrier seal plate 92, an inner circumferential groove 100 is formed that is a second inner circumferential groove facing the outer circumferential groove 94 in the radial direction and is recessed outward in the radial direction, and an inner circumferential protrusion 99 (a third inner circumferential protrusion) is formed that is apart from and faces the outer circumferential protrusion 96 in the radial direction and that inwardly protrudes in the radial direction. A return hole 101 (a second return hole) is formed that penetrates in the first direction in the lowermost portion of the inner circumferential groove 100 in the carrier seal plate 92.

Furthermore, in the carrier seal plate 92, an annular protrusion 97 is formed that is a sixth annular protrusion arranged apart from the annular protrusion 98 of the inner circumferential protrusion 104 towards the outer circumferential side and protruding in the first direction over the circumference of the shaft, and the annular protrusion 44 is formed that is an eighth annular protrusion that is arranged apart from the radially outer circumferential surface of the planetary carrier 91 to the outer circumferential side and protrudes in the first direction over the circumference of the shaft, and the inner circumferential surface of the annular protrusion 44 faces the radially outer circumferential surface of the planetary carrier 91.

The annular protrusion 97 and the annular protrusion 98 of the carrier seal plate 92 face the planetary carrier 91 in the first direction. A root portion of the annular protrusion 98 of the carrier seal plate 92, the inner circumferential surface of annular protrusion 98 including a rotation surface whose inner diameter increases in the first direction, faces the outer circumferential protrusion 95 of the planetary carrier 91, and the inner circumferential protrusion 99 of the carrier seal plate 92 faces the outer circumferential protrusion 96 of the planetary carrier 91.

Each of the outer circumferential protrusion 95, the outer circumferential protrusion 96, the inner circumferential protrusion 104, the inner circumferential protrusion 99, the annular protrusion 98, and the annular protrusion 97 is a carrier side annular protrusion. Each of the outer circumferential groove 93, the outer circumferential groove 94, and the inner circumferential groove 100 is a carrier side annular groove. The first stage labyrinth seal 102 of the second labyrinth seal 27 includes the outer circumferential portion of the planetary carrier 91 and the annular protrusion 44 of the carrier seal plate 92. The second stage labyrinth seal 103 includes the outer circumferential grooves 93 and 94 and the outer circumferential protrusions 95 and 96 of the planetary carrier 91, and the annular protrusions 97 and 98, the inner circumferential protrusions 104 and 99 and the inner circumferential groove 100 of the carrier seal plate 92.

In this Embodiment 5, a portion of the outer circumferential surface of the outer circumferential protrusion 95 of the boss portion of the planetary carrier 91 includes a rotation surface whose outer diameter increases in the first direction. Thus, the lubricating oil attempting to move from the outer circumferential groove 93 to the outer circumferential groove 94 is returned to the outer circumferential groove 93 side due to the rotation of the planetary carrier 91. The lubricating oil moved to the outer circumferential groove 94 is splashed to the inner circumferential groove 100 of the carrier seal plate 92 due to the rotation of the planetary carrier 91 and returned from the return hole 101 to the inside of the planetary gear device 2 in which the lubricating oil is sealed.

The second labyrinth seal 27 of Embodiment 5, by the first stage labyrinth seal 102 and the second stage labyrinth seal 103, prevents the lubricating oil seeped between the outer circumferential portion of the planetary carrier 91 and the annular protrusion 44 from leaking from the gap portion in which the circumferential protrusion 99 faces the outer circumferential protrusion 96. Since the second labyrinth seal 27 of Embodiment 5 has a structure in which the fixed portion and the movable portion are not in contact with each other, the effect of enabling elimination of friction loss due to sliding contact can be expected. In Embodiment 5, the planetary carrier 91 has no annular protrusion. Thus, an effect of enabling structural simplification for easier machine work can be expected.

As explained in detail above, according to each of the above-described embodiments, on the fixed ring 5 side of the bearing inner cylinder 29, the drive shaft seal plate is provided and combined with the slinger fitted in the drive shaft 39 to configure the first labyrinth seal 26. On the planetary carrier side of the bearing inner cylinder 29, a carrier seal plate is provided and combined with the planetary carrier to configure the second labyrinth seal 27. This prevents leakage of the lubricating oil contributing to lubrication to the outside in an area surrounded by the bearing inner cylinder 29, the first labyrinth seal 26, and the second labyrinth seal 27. Since the first labyrinth seal 26 and the second labyrinth seal 27 are configured in a non-contacting manner, friction loss due to sliding contact can be eliminated. In addition, the third labyrinth seal 28 includes the output shaft outer cylinder 11 and the fixed ring 5, can prevent the leakage of the lubricating oil, can eliminate the friction loss, and can prevent water, mud, sand and other foreign matters from entering from the outside.

The configurations of the above-described embodiments relating to the configurations of the first labyrinth seal 26 and the second labyrinth seal 27 can be independently applied. In addition, the first labyrinth seal 26 of any one of Embodiments 1 to 3 and the second labyrinth seal 27 of any one of Embodiments 1, 4, and 5 can be mutually combined and applied. The third labyrinth seal 28 of Embodiment 1 can be used in combination with any of the first labyrinth seal 26 and the second labyrinth seal 27.

The first labyrinth seal 26 of any one of Embodiments 1 to 3, the second labyrinth seal 27 of any one of Embodiments 1, 4, and 5, and the third labyrinth seal 28 of Embodiment 1 can be mutually combined and used for the vehicle wheel drive device 10 illustrated in FIG. 3 and for the vehicle 130 illustrated in FIG. 4.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle wheel
2 Planetary gear device
3 Drive motor
4 Support frame
5 Fixed ring
10 Vehicle wheel drive device
11 Output shaft outer cylinder
12 Output shaft end plate
13 Bearing
14 Internal gear
15 Planetary gear
16 Planetary gear shaft
17 Bearing
18 Sun gear
19, 81, 91 Planetary carrier
20 Planetary shaft support disc
21, 61, 71 Drive shaft seal plate
22, 82, 92 Carrier seal plate
23, 24, 25 O-ring
26 First labyrinth seal
27 Second labyrinth seal
28 Third labyrinth seal
29 Bearing inner cylinder
31, 36, 41, 42, 44, 45, 46, 47, 51, 52, 53, 54, 55, 66, 86, 97, 98 Annular protrusion
32, 37, 40, 50, 57, 58, 59, 60, 62, 72 Annular groove
33, 63 74, 101 Return hole
34, 64, 75, 99, 104 Inner circumferential protrusion
35, 65, 76 Slinger
38, 67, 77, 79, 84, 85, 95, 96 Outer circumferential protrusion
39 Drive shaft
43, 56, 68, 83, 93, 94 Outer circumferential groove
48, 102 First stage labyrinth seal
49, 87, 103 Second stage labyrinth seal
73, 100 Inner circumferential groove
78 Rear seal disc
130 Vehicle
131 Vehicle body
132 Suspension
133 Frame

The invention claimed is:

1. A planetary gear device comprising an internal gear, a planetary gear engaging with the internal gear, a sun gear positioned at the center of the internal gear and engaging with the planetary gear, a planetary carrier rotatably supporting the planetary gear in a state in which the planetary gear engages with the internal gear and the sun gear, a bearing inner cylinder comprising the internal gear on an inner circumferential surface, a bearing coaxially fitting in the outer circumference of the bearing inner cylinder, an output shaft outer cylinder coaxially fitting in the outer circumference of the bearing, and an output shaft end plate that fixes the planetary carrier and is supported by the output shaft outer cylinder, wherein a drive shaft, disposed on a first direction side of one of the axial direction of the bearing inner cylinder, is coupled to the sun gear, and the planetary carrier is arranged on a second direction side of the other of the axial direction of the bearing inner cylinder, the planetary gear device comprising:
  an annular slinger fitted in the drive shaft coupled to the sun gear on the first direction side of the planetary gear device;
  an annular drive shaft seal plate fitted in an inner circumference of the bearing inner cylinder on the first direction side of the bearing inner cylinder, the drive shaft being inserted in the annular drive shaft seal plate, and the annular drive shaft seal plate arranged apart from the slinger so as to form a gap in the radial direction between the drive shaft and the slinger; and
  an annular carrier seal plate fitted in the inner circumference of the bearing inner cylinder, the planetary carrier being inserted at the center of the annular carrier seal plate so as to form a gap in the radial direction between the planetary carrier and the annular carrier seal plate, on the second direction side of the planetary gear device,
  wherein:
    a drive shaft side annular protrusion protruding over the circumference of the drive shaft is formed on one of the slinger and the drive shaft seal plate, a drive shaft side annular groove recessed over the circumference of the drive shaft is formed on the other of the slinger and the drive shaft seal plate, and a first labyrinth seal comprises the drive shaft side annular protrusion and the drive shaft side annular groove; and
    a carrier side annular protrusion protruding over the circumference of the shaft of the planetary carrier is formed on one of the carrier seal plate and the planetary carrier, a carrier side annular groove recessed over the circumference of the shaft of the planetary carrier is formed on the other of the carrier seal plate and the planetary carrier, and a second labyrinth seal comprises the carrier side annular protrusion and the carrier side annular groove.

2. The planetary gear device according to claim 1, wherein
  a first annular protrusion, a first annular groove, a first inner circumferential protrusion, and a first return hole are formed in the drive shaft seal plate,
    the first annular protrusion protruding in the first direction over the circumference at the inner circumference of the drive shaft seal plate,
    the first annular groove recessed in the second direction over the circumference of the shaft on the outer circumferential side of the first annular protrusion,
    the first inner circumferential protrusion protruding further to the first direction than the first annular protrusion over the circumference of the shaft at the outer circumference of the first annular groove, and the first direction side tip extending in the first direction on the inner circumferential side over the circumference of the shaft, and
    the first return hole penetrating in the second direction at a lowest portion of the first annular groove,
  wherein the slinger comprises a cylindrical portion radially facing the inner circumference of the drive shaft seal plate to form a gap,
  a second annular groove, a second annular protrusion, and a first outer circumferential protrusion are formed in the slinger,
    the second annular groove recessed in the first direction over the circumference of the drive shaft, and fitting into the first annular protrusion of the drive shaft seal plate to form a gap,
    the second annular protrusion protruding in the second direction over the circumference of the shaft at the outer circumference of the second annular groove and fitted in the first annular groove of the drive shaft seal plate to form a gap, and
    the first outer circumferential protrusion outwardly protruding towards the radial direction over the circumference of the shaft on the outer circumference of the slinger and radially facing the first inner circumferential protrusion of the drive shaft seal plate in a radial direction forming a gap;
  wherein each of the first annular protrusion and the second annular protrusion is the drive shaft side annular protrusion,
  wherein each of the first annular groove and the second annular groove is the drive shaft side annular groove, and
  wherein the first labyrinth seal comprises the first annular protrusion, the first annular groove, and the first inner circumferential protrusion of the drive shaft seal plate, and the cylindrical portion, the second annular groove, the second annular protrusion, and the first outer protrusion of the slinger.

3. The planetary gear device according to claim 2, wherein
  a first outer circumferential groove comprising a rotation surface whose outer diameter decreases in the first direction and recessed inward in the radial direction is formed on the first direction side of the second annular protrusion of the slinger, and
  the inner circumferential surface of the first annular groove of the drive shaft seal plate comprises a rotation surface whose inner diameter increases in the first direction.

4. The planetary gear device according to claim 2, wherein
  the slinger comprises a second outer circumferential protrusion protruding in the radial direction over the circumference of the shaft on the outer circumferential side of the second annular protrusion, the second outer circumferential protrusion including a rotation surface whose outer diameter decreases in the first direction on the first direction side, and
  wherein the first outer circumferential protrusion of the slinger includes a rotation surface whose inner diameter increases in the second direction on the second direction side of the first outer circumferential protrusion.

5. The planetary gear device according to claim 1, wherein:
  the planetary carrier comprises a cylindrical boss portion at the center thereof protruding in the second direction,
  a second outer circumferential groove, a third annular protrusion, and a fourth annular protrusion are formed in the planetary carrier, the second outer circumferential groove recessed inward in the radial direction over the entire outer circumference in the radial direction of the boss portion, the third annular protrusion protruding in the second direction over the circumference of the shaft and separated from the outer circumferential surface of the boss portion, and the fourth annular protrusion protruding in the second direction over the circumference of the shaft and arranged farther to the outer circumferential side than the third annular protrusion, a fifth annular protrusion, a sixth annular protrusion, a seventh annular protrusion, and an eighth annular protrusion are formed on the carrier seal plate, the fifth annular protrusion arranged apart from and further to the inner circumferential side than the third annular protrusion of the planetary carrier and protruding in the first direction over the circumference of the shaft, the sixth annular protrusion arranged further to the outer circumferential side than the third annular protrusion and further to the inner circumferential side than the fourth annular protrusion, and protruding in the first direction over the circumference of the shaft so as to form a third annular groove between the fifth annular protrusion and the sixth annular protrusion and to sandwich the third annular protrusion to form a gap, the seventh annular protrusion arranged apart from and further to the outer circumferential side than the sixth annular protrusion and further to the inner circumferential side than the fourth annular protrusion, and protruding in the first direction over the circumference of the shaft, and the eighth annular protrusion protruding in the first direction over the circumference of the shaft so as to form a fourth annular groove between the seventh annular protrusion and the eighth annular protrusion and to sandwich the fourth annular protrusion forming a gap on the outer circumferential side of the fourth annular protrusion, each of the third annular protrusion and the fourth annular protrusion is the carrier side annular protrusion, each of the third annular groove and the fourth annular groove is the carrier side annular groove, and the second labyrinth seal comprises the second outer circumferential groove, the third annular protrusion, and the fourth annular protrusion of the planetary carrier, and the fifth annular protrusion, the third annular groove, the sixth annular protrusion, the seventh annular protrusion, the fourth annular groove, and the eighth annular protrusion of the carrier seal plate.

6. The planetary gear device according to claim 5, wherein the inner circumferential surface of the carrier seal plate is a rotation surface whose inner diameter increases in the first direction, a third outer circumferential groove and a third outer circumferential protrusion are formed in the boss portion of the planetary carrier, the third outer circumferential groove being recessed inward in the radial direction over the entire circumference of the boss portion on the radially outer circumferential surface of the boss portion, and formed to the second direction side of the second outer circumferential groove, and the third outer circumferential protrusion protruding outward in the radial direction over the entire circumference of the boss portion between the second outer circumferential groove and the third outer circumferential groove, and the outer circumferential surface of the third outer circumferential protrusion is arranged apart from the inner circumferential surface of the carrier seal plate and comprises a rotation surface whose outer diameter increases in the first direction.

7. The planetary gear device according to claim 1, wherein:

the planetary carrier comprises a cylindrical boss portion disposed at the center thereof and protruding in the second direction, a second outer circumferential groove, a third outer circumferential groove, a third outer circumferential protrusion, and a fourth outer circumferential protrusion are formed in an radially outer circumferential surface of the boss portion, the second outer circumferential groove recessed inward in the radial direction over the entire circumference of the boss portion, the third outer circumferential groove recessed inward in the radial direction over the entire circumference of the boss portion, and formed on the second direction side of the second outer circumferential groove, the third outer circumferential protrusion protruding outward in the radial direction between the second outer circumferential groove and the third outer circumferential groove, the fourth outer circumferential protrusion protruding outward in the radial direction towards the second direction side of the third outer circumferential groove, a second inner circumferential protrusion, a second inner circumferential groove, a third inner circumferential protrusion, a fifth annular protrusion, a sixth annular protrusion, an eighth annular protrusion, and a second return hole are formed in the carrier seal plate, the second inner circumferential protrusion arranged apart from and facing the third outer circumferential protrusion in the radial direction, and protruding inward in the radial direction, the second inner circumferential groove recessed outward in the radial direction, and facing the third outer circumferential groove in the radial direction, the third inner circumferential protrusion arranged apart from and facing the fourth outer circumferential protrusion in the radial direction, and protruding inward in the radial direction, the fifth annular protrusion protruding in the first direction over the circumference of the shaft at an inner circumference end portion of the second inner circumferential protrusion, and an inner circumferential surface of the fifth annular protrusion comprising a rotation surface whose inner diameter increases in the first direction, the sixth annular protrusion arranged apart from the fifth annular protrusion towards the outer circumferential side and protruding in the first direction over the circumference of the shaft, the eighth annular protrusion arranged apart from the radially outer circumferential surface of the planetary carrier on the outer circumferential side, protruding in the first direction over the circumference of the shaft, and an inner circumferential surface thereof facing the radially outer circumferential surface of the planetary carrier, and, the second return hole penetrating in the first direction at the lowermost portion of the second inner circumferential groove, wherein the third outer circumferential protrusion of the planetary carrier forms a rotation surface along the rotation surface of the fifth annular protrusion on a portion of a radially outer circumferential surface, each of the third outer circumferential protrusion, the fourth outer circumferential protrusion, the second inner circumferential protrusion, the third inner circumferential protrusion, the fifth annular protrusion, and the sixth annular protrusion is the carrier side annular protrusion, each of the second outer circumferential groove, the third outer circumferential groove, and the second inner circumferential groove is the carrier side annular groove, and the second labyrinth seal comprises the third outer circumferential protrusion, the fourth outer circumferential protrusion, the second outer circumferential groove, the third outer circumferential groove, and the outer circumferential surface of the planetary carrier, and the second inner circumferential protrusion, the third inner circumferential protrusion, the inner circumferential groove, the fifth annular protrusion, the sixth annular protrusion and the eighth annular protrusion of the carrier seal plate.

8. A vehicle wheel drive device comprising:
the planetary gear device according to claim 1;
a vehicle wheel fitted in the outer circumference of the output shaft outer cylinder in a rotation preventing manner,
a fixed ring to fix on the first direction side the first direction end portion in the axial direction of the bearing inner cylinder, the drive shaft being inserted through the fixed ring, and
a support frame to fixedly support the fixed ring on the first direction side,
wherein an outer cylinder annular protrusion and an outer cylinder annular groove are formed in the output shaft outer cylinder on a surface facing the fixed ring in the axial direction on the first direction side,
the outer cylinder annular protrusion protruding in the first direction over the circumference of the shaft of the planetary gear device, and
the outer cylinder annular groove recessed in the second direction over the circumference of the shaft on the outer circumferential side of the outer cylinder annular protrusion,
a fixed ring annular protrusion, a fixed ring annular groove, and a fixed ring outer circumferential groove are formed on a surface facing the output shaft outer cylinder of the fixed ring in the axial direction,
the fixed ring annular protrusion protruding in the second direction over the circumference of the shaft of the planetary gear device and fitted in the outer cylinder annular groove to form a gap,
the fixed ring annular groove recessed in the first direction over the circumference of the shaft on the inner circumferential side of the fixed ring annular protrusion and the outer cylinder annular protrusion fitted into the fixed ring annular groove to form a gap, and the fixed ring outer circumferential groove recessed inward in the radial direction over the entire circumference and formed further to the first direction side than the fixed ring annular protrusion on the radially outer circumferential surface on the radially outer circumferential side of the fixed ring annular protrusion, wherein a third labyrinth seal comprises the outer cylinder annular protrusion, the outer cylinder annular groove, the fixed ring annular protrusion, the fixed ring annular groove, and the fixed ring outer circumferential groove.

9. The planetary gear device according to claim 2, wherein:

the planetary carrier comprises a cylindrical boss portion at the center thereof protruding in the second direction, a second outer circumferential groove, a third annular protrusion, and a fourth annular protrusion are formed in the planetary carrier, the second outer circumferential groove recessed inward in the radial direction over the entire outer circumference in the radial direction of the boss portion, the third annular protrusion protruding in the second direction over the circumference of the shaft and separated from the outer circumferential surface of the boss portion, and the fourth annular protrusion protruding in the second direction over the circumference of the shaft and arranged farther to the outer circumferential side than the third annular protrusion, a fifth annular protrusion, a sixth annular protrusion, a seventh annular protrusion, and an eighth annular protrusion are formed on the carrier seal plate, the fifth annular protrusion arranged apart from and further to the inner circumferential side than the third annular protrusion of the planetary carrier and protruding in the first direction over the circumference of the shaft, the sixth annular protrusion arranged further to the outer circumferential side than the third annular protrusion and further to the inner circumferential side than the fourth annular protrusion, and protruding in the first direction over the circumference of the shaft so as to form a third annular groove between the fifth annular protrusion and the sixth annular protrusion and to sandwich the third annular protrusion to form a gap, the seventh annular protrusion arranged apart from and further to the outer circumferential side than the sixth annular protrusion and further to the inner circumferential side than the fourth annular protrusion, and protruding in the first direction over the circumference of the shaft, and the eighth annular protrusion protruding in the first direction over the circumference of the shaft so as to form a fourth annular groove between the seventh annular protrusion and the eighth annular protrusion and to sandwich the fourth annular protrusion forming a gap on the outer circumferential side of the fourth annular protrusion, each of the third annular protrusion and the fourth annular protrusion is the carrier side annular protrusion, each of the third annular groove and the fourth annular groove is the carrier side annular groove, and the second labyrinth seal comprises the second outer circumferential groove, the third annular protrusion, and the fourth annular protrusion of the planetary carrier, and the fifth annular protrusion, the third annular groove, the sixth annular protrusion, the seventh annular protrusion, the fourth annular groove, and the eighth annular protrusion of the carrier seal plate.

10. The planetary gear device according to claim 2, wherein:
the planetary carrier comprises a cylindrical boss portion disposed at the center thereof and protruding in the second direction,
a second outer circumferential groove, a third outer circumferential groove, a third outer circumferential protrusion, and a fourth outer circumferential protrusion are formed in an radially outer circumferential surface of the boss portion,
   the second outer circumferential groove recessed inward in the radial direction over the entire circumference of the boss portion,
   the third outer circumferential groove recessed inward in the radial direction over the entire circumference of the boss portion, and formed on the second direction side of the second outer circumferential groove,
   the third outer circumferential protrusion protruding outward in the radial direction between the second outer circumferential groove and the third outer circumferential groove,
   the fourth outer circumferential protrusion protruding outward in the radial direction towards the second direction side of the third outer circumferential groove,
a second inner circumferential protrusion, a second inner circumferential groove, a third inner circumferential protrusion, a fifth annular protrusion, a sixth annular protrusion, an eighth annular protrusion, and a second return hole are formed in the carrier seal plate,
   the second inner circumferential protrusion arranged apart from and facing the third outer circumferential protrusion in the radial direction, and protruding inward in the radial direction,
   the second inner circumferential groove recessed outward in the radial direction, and facing the third outer circumferential groove in the radial direction,
   the third inner circumferential protrusion arranged apart from and facing the fourth outer circumferential protrusion in the radial direction, and protruding inward in the radial direction,
   the fifth annular protrusion protruding in the first direction over the circumference of the shaft at an inner circumference end portion of the second inner circumferential protrusion, and an inner circumferential surface of the fifth annular protrusion comprising a rotation surface whose inner diameter increases in the first direction,
   the sixth annular protrusion arranged apart from the fifth annular protrusion towards the outer circumferential side and protruding in the first direction over the circumference of the shaft,
   the eighth annular protrusion arranged apart from the radially outer circumferential surface of the planetary carrier on the outer circumferential side, protruding in the first direction over the circumference of the shaft, and an inner circumferential surface thereof facing the radially outer circumferential surface of the planetary carrier, and,
   the second return hole penetrating in the first direction at the lowermost portion of the second inner circumferential groove,
wherein the third outer circumferential protrusion of the planetary carrier forms a rotation surface along the rotation surface of the fifth annular protrusion on a portion of a radially outer circumferential surface,
each of the third outer circumferential protrusion, the fourth outer circumferential protrusion, the second inner circumferential protrusion, the third inner circumferential protrusion, the fifth annular protrusion, and the sixth annular protrusion is the carrier side annular protrusion,
each of the second outer circumferential groove, the third outer circumferential groove, and the second inner circumferential groove is the carrier side annular groove, and
the second labyrinth seal comprises the third outer circumferential protrusion, the fourth outer circumferential protrusion, the second outer circumferential groove, the third outer circumferential groove, and the outer circumferential surface of the planetary carrier, and the second inner circumferential protrusion, the third inner circumferential protrusion, the second inner circumferential groove, the fifth annular protrusion, the sixth annular protrusion and the eighth annular protrusion of the carrier seal plate.

11. A vehicle wheel drive device comprising:
the planetary gear device according to claim 2;
a vehicle wheel fitted in the outer circumference of the output shaft outer cylinder in a rotation preventing manner,
a fixed ring to fix on the first direction side the first direction end portion in the axial direction of the bearing inner cylinder, the drive shaft being inserted through the fixed ring, and
a support frame to fixedly support the fixed ring on the first direction side,
wherein an outer cylinder annular protrusion and an outer cylinder annular groove are formed in the output shaft outer cylinder on a surface facing the fixed ring in the axial direction on the first direction side,
   the outer cylinder annular protrusion protruding in the first direction over the circumference of the shaft of the planetary gear device, and
   the outer cylinder annular groove recessed in the second direction over the circumference of the shaft on the outer circumferential side of the outer cylinder annular protrusion,
a fixed ring annular protrusion, a fixed ring annular groove, and a fixed ring outer circumferential groove are formed on a surface facing the output shaft outer cylinder of the fixed ring in the axial direction,
   the fixed ring annular protrusion protruding in the second direction over the circumference of the shaft of the planetary gear device and fitted in the outer cylinder annular groove to form a gap,
   the fixed ring annular groove recessed in the first direction over the circumference of the shaft on the inner circumferential side of the fixed ring annular protrusion and the outer cylinder annular protrusion fitted into the fixed ring annular groove to form a gap, and
   the fixed ring outer circumferential groove recessed inward in the radial direction over the entire circumference and formed further to the first direction side than the fixed ring annular protrusion on the radially outer circumferential surface on the radially outer circumferential side of the fixed ring annular protrusion, wherein a third labyrinth seal comprises the outer cylinder annular protrusion, the outer cylinder annular groove, the fixed ring annular protrusion, the fixed ring annular groove, and the fixed ring outer circumferential groove.

\* \* \* \* \*